US011312074B2

(12) United States Patent
Damiano et al.

(10) Patent No.: US 11,312,074 B2
(45) Date of Patent: Apr. 26, 2022

(54) LIQUID INTERFACE TECHNIQUES FOR ADDITIVE FABRICATION AND RELATED SYSTEMS AND METHODS

(71) Applicant: Formlabs, Inc., Somerville, MA (US)

(72) Inventors: Adam Damiano, Somerville, MA (US); Dmitri Megretski, Carlisle, MA (US); Shane Wighton, Raleigh, NC (US); Maxim Lobovsky, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 218 days.

(21) Appl. No.: 16/570,981

(22) Filed: Sep. 13, 2019

(65) Prior Publication Data
US 2021/0078251 A1   Mar. 18, 2021

(51) Int. Cl.
| | |
|---|---|
| *B29C 64/255* | (2017.01) |
| *B29C 64/245* | (2017.01) |
| *B33Y 30/00* | (2015.01) |
| *B29C 64/124* | (2017.01) |

(52) U.S. Cl.
CPC .......... *B29C 64/255* (2017.08); *B29C 64/245* (2017.08); *B29C 64/124* (2017.08); *B33Y 30/00* (2014.12)

(58) Field of Classification Search
CPC ... B29C 64/124; B29C 64/129; B29C 64/135; B29C 64/214; B29C 64/205; B29C 64/255; B29C 64/245
See application file for complete search history.

(56) References Cited

U.S. PATENT DOCUMENTS

| | | |
|---|---|---|
| 5,236,637 A | 8/1993 | Hull |
| 5,248,456 A | 9/1993 | Evans, Jr. et al. |
| 5,391,072 A | 2/1995 | Lawton et al. |

(Continued)

FOREIGN PATENT DOCUMENTS

| | | | |
|---|---|---|---|
| WO | WO 2018/143904 A1 | 8/2018 | |
| WO | WO-2018143904 A1 * | 8/2018 | ............. B33Y 80/00 |

(Continued)

OTHER PUBLICATIONS

PCT/US2020/050448, Dec. 11, 2020, International Search Report and Written Opinion.

(Continued)

*Primary Examiner* — Joseph S Del Sole
*Assistant Examiner* — Jamel M Nelson
(74) *Attorney, Agent, or Firm* — Wolf, Greenfield & Sacks, P.C.

(57) ABSTRACT

According to some aspects, an additive fabrication apparatus is provided configured to form layers of material on a build platform, each layer of material being formed so as to contact a supporting liquid or a film disposed within a container, in addition to the build platform, a liquid photopolymer, and/or a previously formed layer of a material. The additive fabrication apparatus may comprise a container and a leveling element, wherein the leveling element is configured to move across a liquid-liquid interface to promote or create a flat interface between the two liquids. According to some aspects, the additive fabrication comprises a film disposed between two liquids, wherein the film maintains or provides a flat surface at the interface of the two liquids.

17 Claims, 23 Drawing Sheets

(56) References Cited

U.S. PATENT DOCUMENTS

| | | |
|---|---|---|
| 2015/0165678 A1 | 6/2015 | Ding et al. |
| 2015/0224710 A1* | 8/2015 | El-Siblani ............. B33Y 10/00 |
| | | 264/401 |
| 2017/0028618 A1 | 2/2017 | Robeson et al. |
| 2019/0001553 A1 | 1/2019 | Robeson et al. |
| 2019/0039300 A1* | 2/2019 | Mckinnell ............. B29C 64/393 |
| 2019/0160733 A1 | 5/2019 | Mirkin et al. |
| 2019/0344346 A1* | 11/2019 | Tucker ................... B22F 10/20 |

FOREIGN PATENT DOCUMENTS

| | | | |
|---|---|---|---|
| WO | WO 2019/140160 A1 | 7/2019 | |
| WO | WO-2019140160 A1 * | 7/2019 | ............. B33Y 40/00 |

OTHER PUBLICATIONS

International Search Report and Written Opinion dated Nov. 25, 2020 in connection with International Application No. PCT/US2020/050448.

* cited by examiner

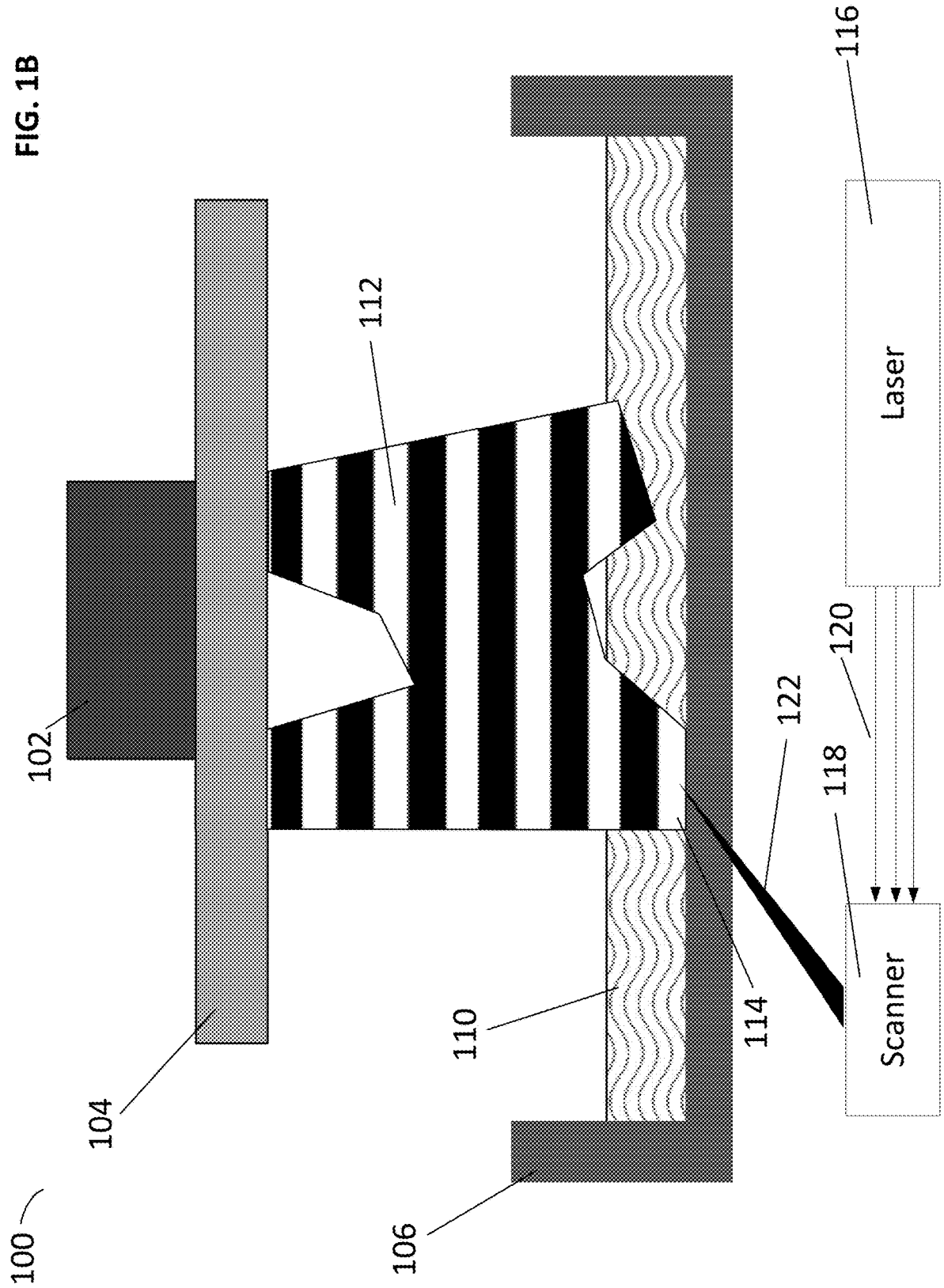

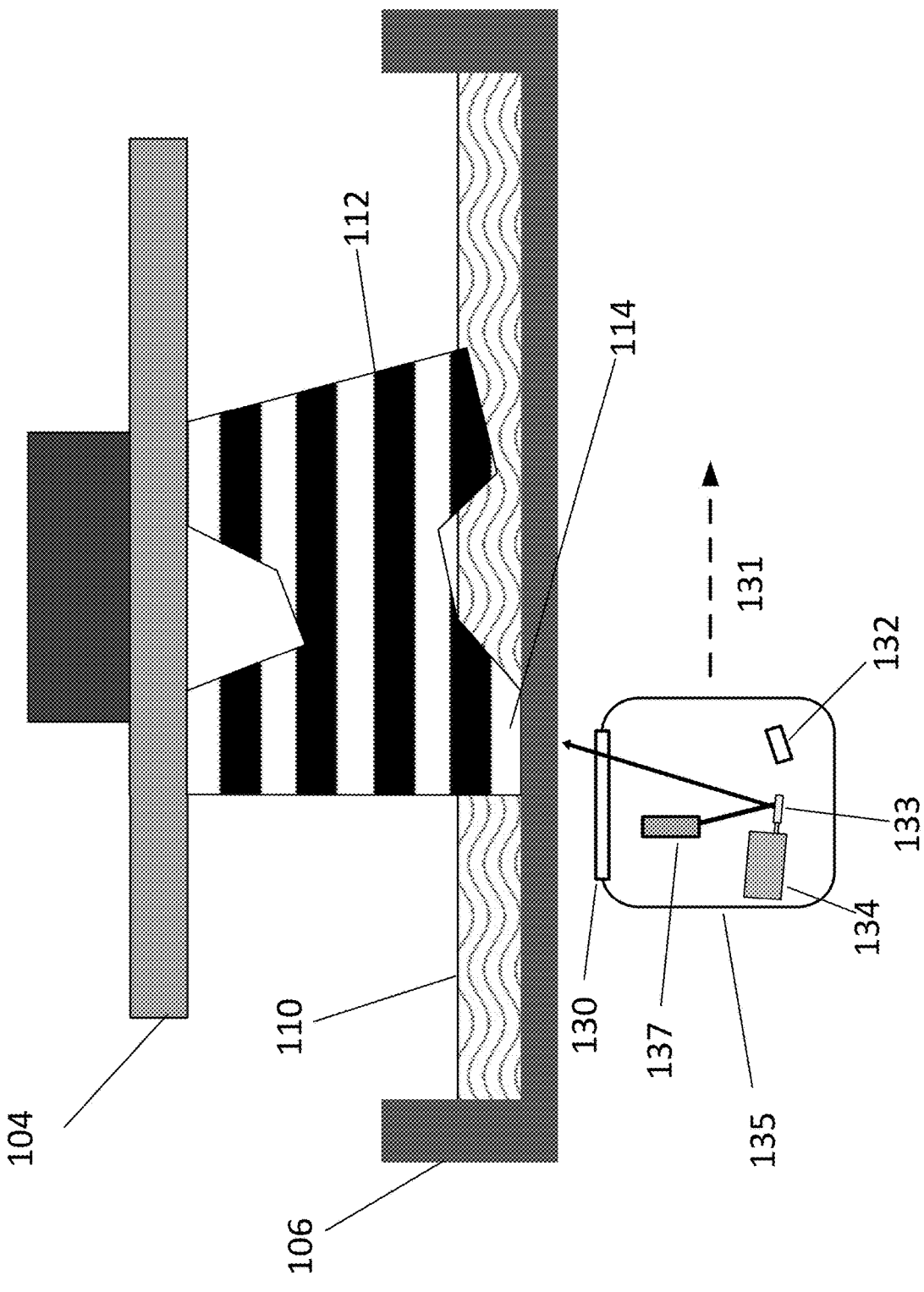

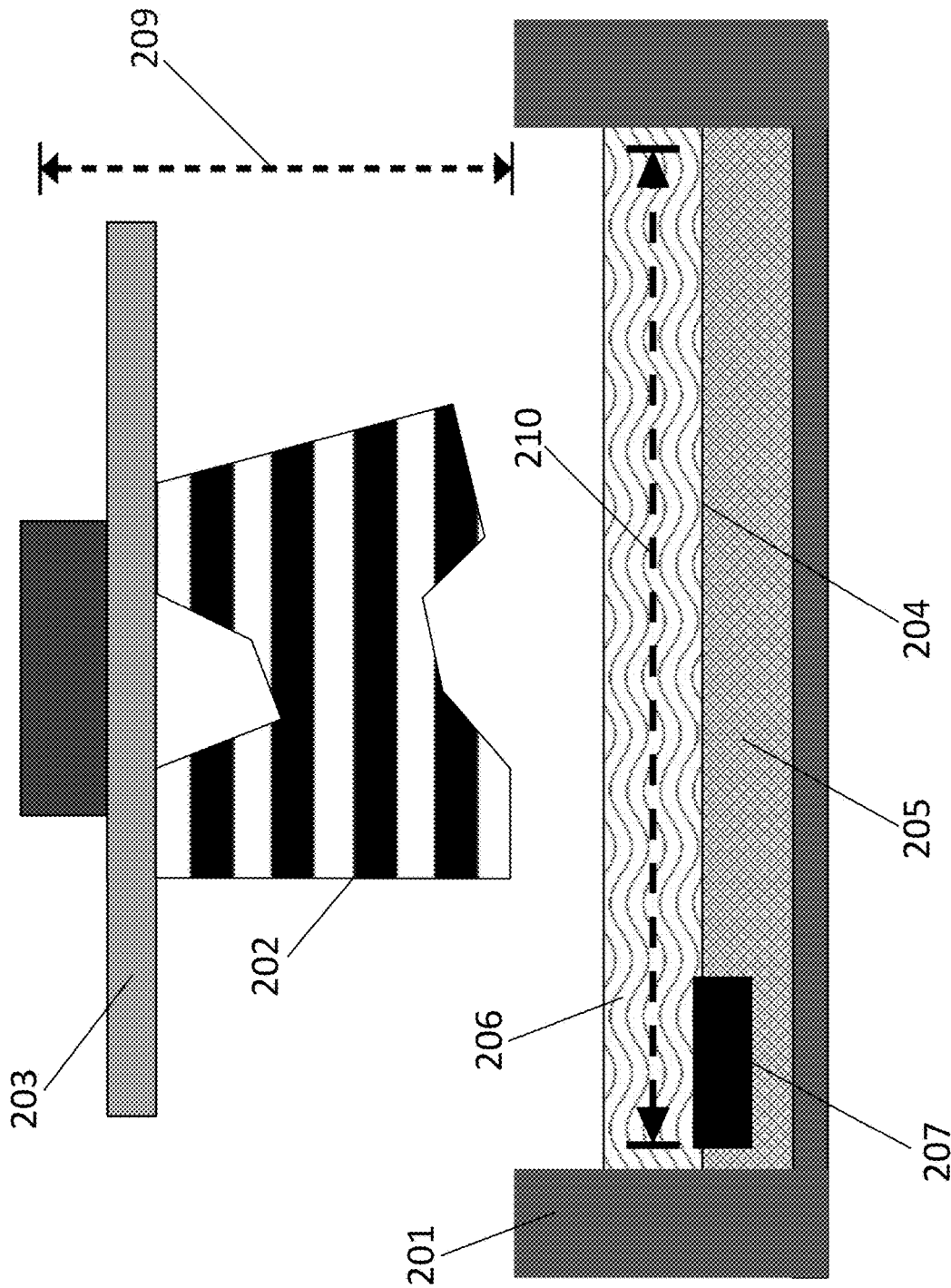

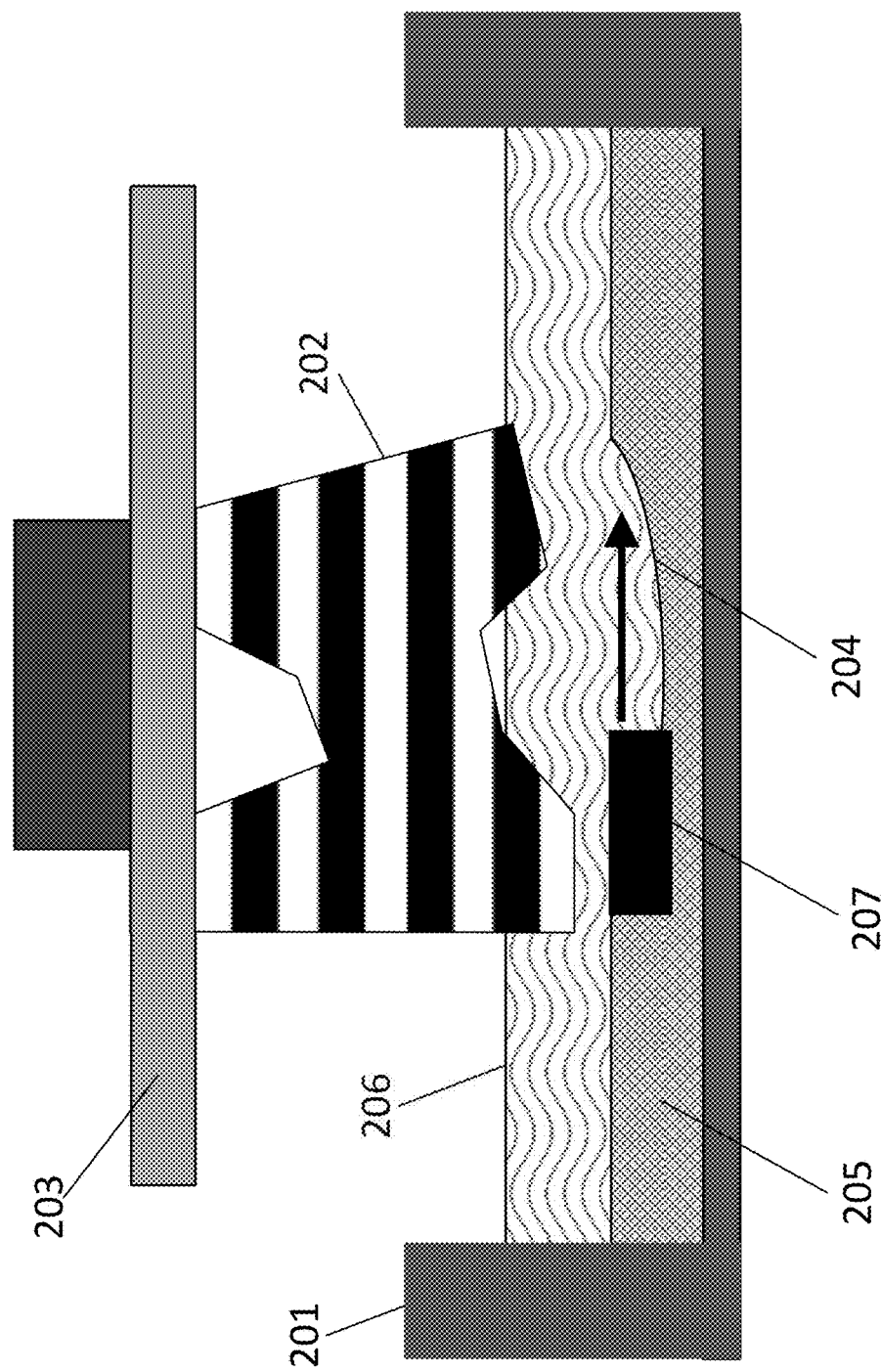

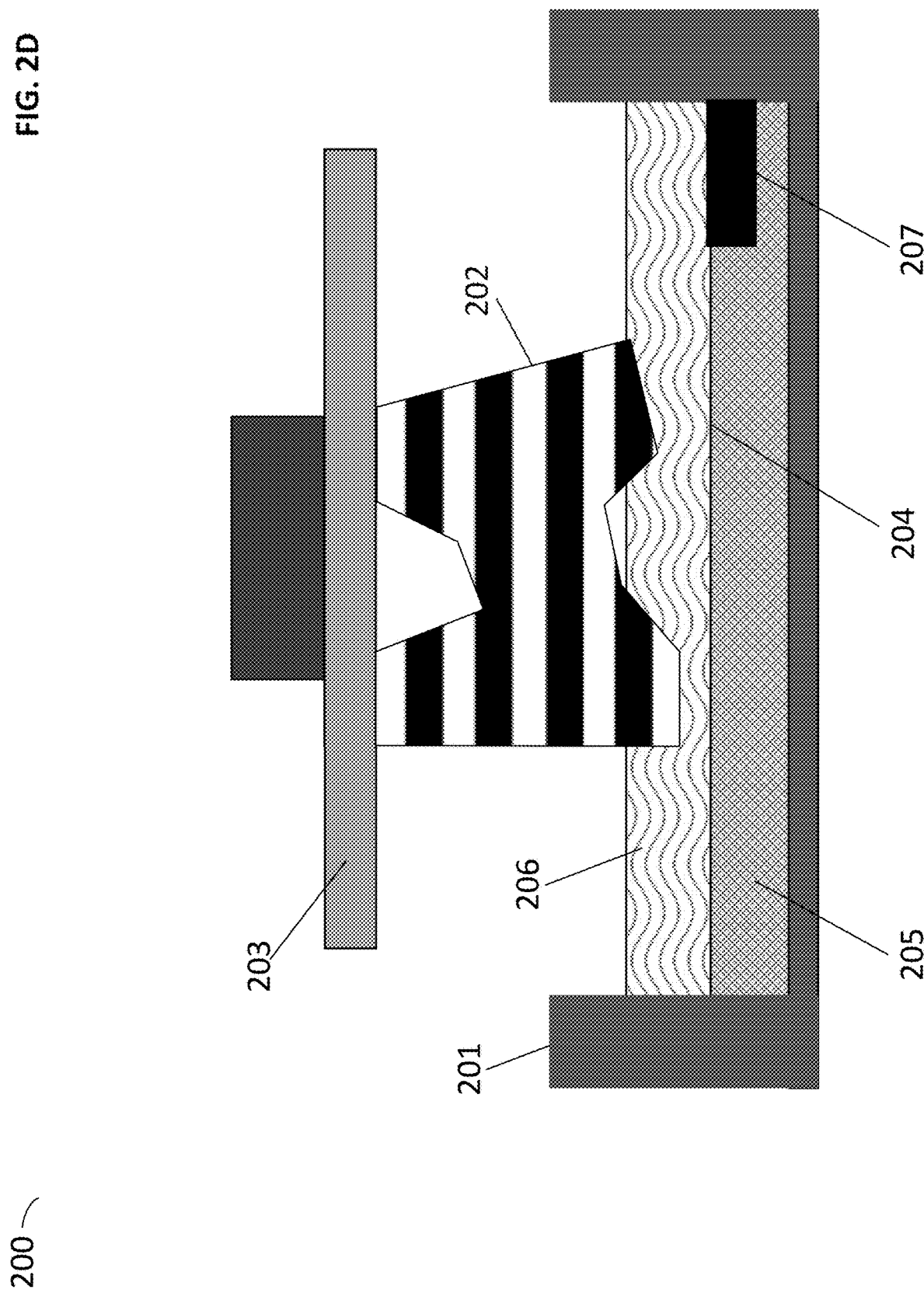

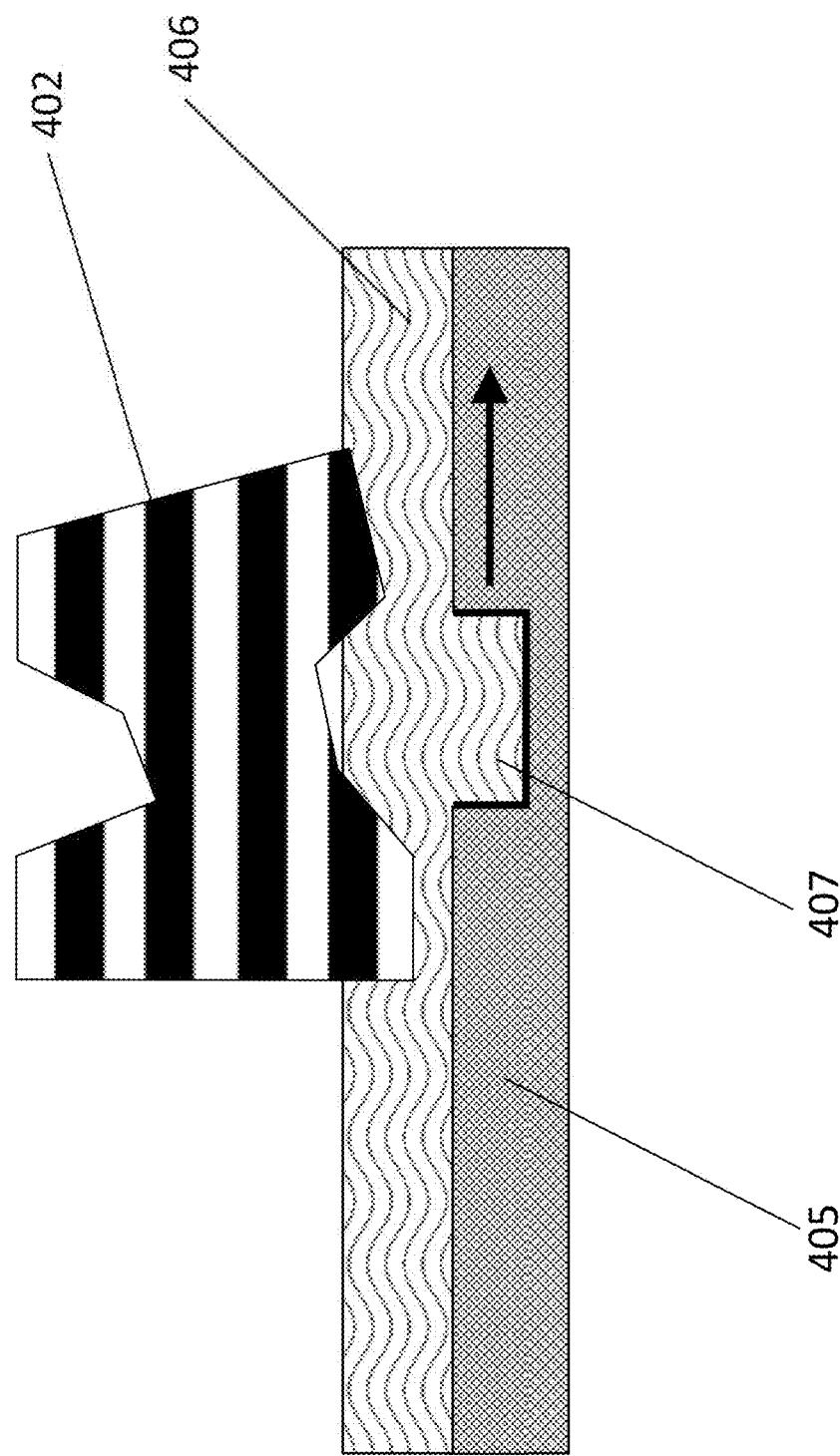

700

LIQUID INTERFACE TECHNIQUES FOR ADDITIVE FABRICATION AND RELATED SYSTEMS AND METHODS

TECHNICAL FIELD

The present application relates generally to systems and methods for separating an object from a liquid-liquid interface within an additive fabrication (e.g., 3-dimensional printing) device.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically, each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or to the bottom surface of the substrate.

SUMMARY

The subject matter of the present invention involves, in some cases, interrelated products, alternative solutions to a particular problem, and/or a plurality of different uses of one or more systems and/or articles.

Techniques to provide a flat interface between a liquid photopolymer and a supporting liquid for additive fabrication (e.g. 3D printing) are generally described.

In one aspect, an apparatus for additive fabrication configured to form a plurality of layers of material on a build platform by directing actinic radiation onto a liquid photopolymer is described. The apparatus comprises a container, the build platform, a supporting liquid arranged within the container. The apparatus also comprises a leveling element arranged adjacent to the supporting liquid and at least one controller configured to move the leveling element through the supporting liquid along an upper surface of the supporting liquid.

In another aspect, an apparatus for additive fabrication configured to form a plurality of layers of material on a build platform by directing actinic radiation onto a liquid photopolymer is described. The apparatus comprises a container, the build platform, and a supporting liquid arranged within the container. In addition, the apparatus comprises a film coupled to the container and arranged over and in contact with the supporting liquid.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 1A-1C depict illustrative additive fabrication devices, according to some embodiments;

FIGS. 2A-2H illustrate schematic views of an additive fabrication device configured with a leveling element, according to some embodiments;

FIGS. 4A-4F depict schematic views of an additive fabrication device comprising a leveling element that produces a flat liquid-liquid interface via suction, according to some embodiments;

DETAILED DESCRIPTION

Additive fabrication techniques (e.g., 3D printing) form solid objects by solidifying (curing) a liquid, such as a liquid photopolymer. Conventionally, these techniques use a container to house a liquid photopolymer; a source of actinic radiation directed at the liquid photopolymer to effect curing of the photopolymer; and a moveable build platform that can position and move a forming object created by layer-by-layer curing of the liquid photopolymer.

Figure 1A:
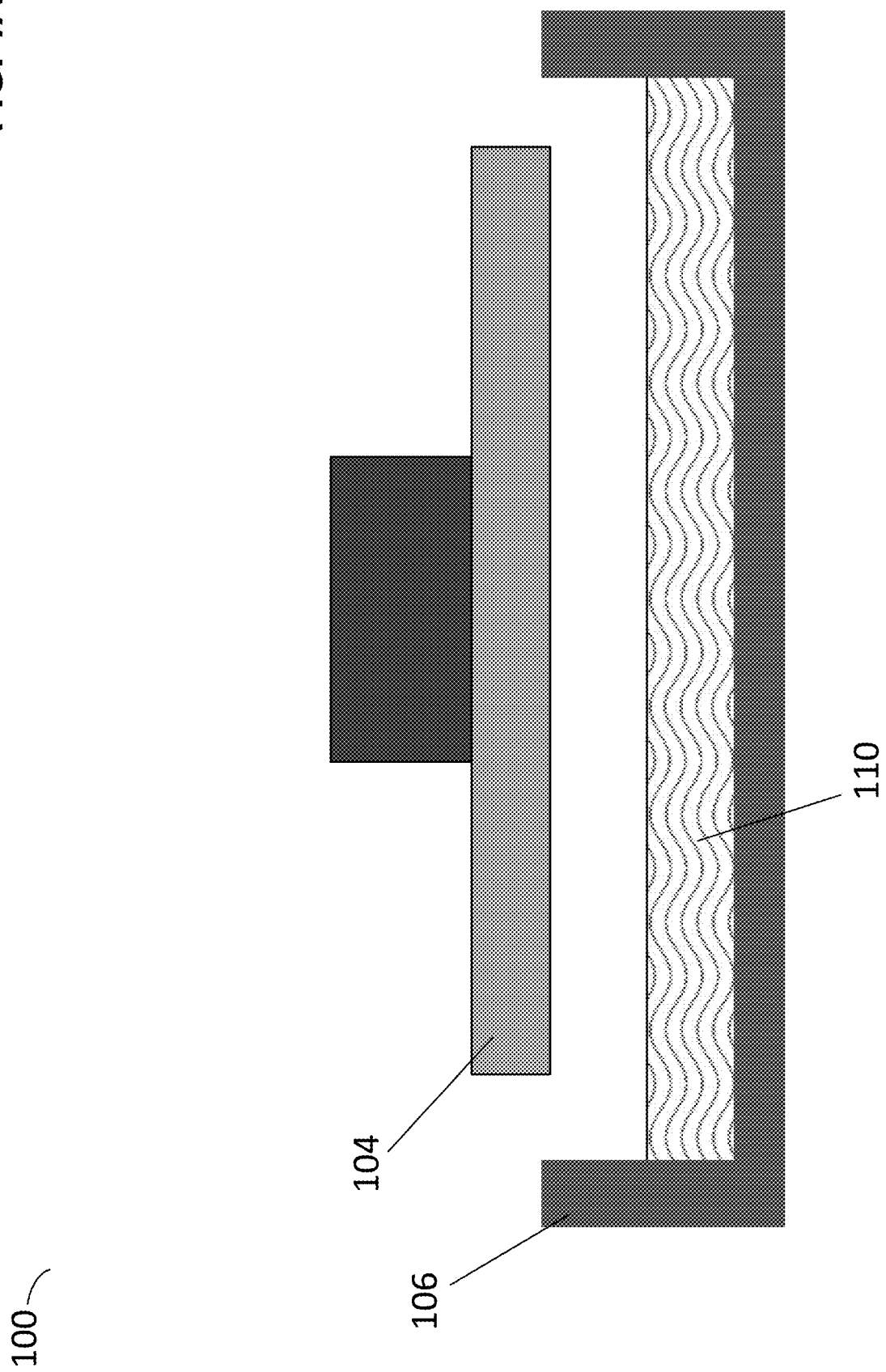

To provide illustrative examples of an additive fabrication process in which the techniques described herein may be employed, FIGS. 1A-1C depict illustrative additive fabrication systems. In the non-limiting example of FIG. 1A, illustrative stereolithographic printer 100 includes a build platform 104 on which a part is to be fabricated, and is configured to fabricate the part by curing select regions of liquid photopolymer 110, which is held in container 106. To form a layer of the part, the build platform is arranged close to the bottom of the container 106 and select regions of the liquid between the build platform and the container are cured with a source of actinic radiation, such as a laser or display screen (DLP, LCD, microLED) (not shown), which passes through the bottom of the container. As a result, an initial layer of the part is formed in a downward facing direction on build platform 104 such that the initial layer is formed in contact with the surface of the container in addition to the build platform. Subsequently, the build platform may be moved so that the initial layer is close to the bottom of the container, and a second layer formed on the initial layer, and so forth.

FIG. 1A represents a configuration of stereolithographic printer 100 prior to formation of any layers of an object on build platform 104. Multiple techniques may be applied to stereolithographic printer 100 to direct actinic radiation to a portion of the liquid photopolymer 110. As illustrative examples, FIGS. 1B and 1C show two different techniques for directing actinic radiation into the "build volume" (a volume within the container in which solid material may be formed). In particular, FIG. 1B depicts the use of a laser light source coupled to optical components to direct the light into selected parts of the build volume, while and FIG. 1C depicts the use of a movable stage containing a source of light which may be moved across the container along one axis while directing light along another axis.

Referring specifically now to FIG. 1B, an embodiment of an additive fabrication apparatus configured with a laser light source coupled to optical components is illustrated. As discussed above, object 112 may be formed layer-by-layer with the initial layer attached to the build platform 104. The layers of the object 112 are each formed from the same material but are shown in alternating shades merely to visually distinguish them in this non-limiting example. At least a portion of the base of the container is transparent to light produced by the laser, such that the laser light can be targeted at regions of liquid photopolymer within the container. Exposure to the laser light cures a region of the liquid photopolymer, which causes it to harden. The layer 114 is at least partially in contact with both a previously formed layer and the surface of the container 106 when it is formed. The top side of the cured photopolymer layer typically bonds to either the bottom surface of the build platform 104 or with the previously cured photopolymer layer in addition to the transparent floor of the container.

In order to form the layer 114 by exposing a region of the liquid photopolymer to actinic radiation, the stereolithographic printer 100 may operate the laser 116 and scanner system 118 to produce a laser beam 122. The laser 116 can produce laser light rays 120 which are directed to the scanner system 118. The scanner system 118 directs a laser beam 122 to a location of the build volume. Exposure of a portion of the liquid photopolymer 110 to the laser cures the portion of the liquid photopolymer. For example, when an entire portion of the build volume of layer 114 has been exposed to the laser beam 122, layer 114 of the part 112 may be formed. The scanner system 118 may include any number and type of optical components, such as multiple galvanometers and/or lenses that may be operated to direct the light emitted by laser 116.

Another method for directing actinic radiation to a portion of the liquid photopolymer is illustrated in in FIG. 1C, which, in contrast to FIG. 1B, uses a movable stage to in part direct actinic radiation. In this illustrative example, optical components such as light source 137, light sensor 132, optical component 133, and mechanical component 134 may be housed in a movable stage 135 (which may also be termed an "optical module"). Optical window 130 is disposed on or within movable stage 135 such that light may be directed out of movable stage 135 and onto container 106 and liquid photopolymer 110 to form layers of a part 112 during an additive fabrication process. Movable stage 135 may be formed of any suitable material to protect the housed components from debris and/or mechanical damage. For example, movable stage 135 may be formed of rigid or flexible material. Movable stage 135 may be formed in such a way as to be sealed from the outside environment in order to keep out any debris (e.g. dust, cured liquid photopolymer, and/or other particulates, as non-limiting examples). Movable stage 135 may be scanned along the x-axis 131 while light is scanned along the y-axis (not pictured) by optical component 133 and/or mechanical component 134, thereby scanning light through a 2-dimensional area.

While the above examples include a laser as a source of actinic radiation, it will be appreciated that other sources may also (or additionally) be used in an additive fabrication device. For instance, some additive fabrication devices may comprise a display screen or projector as a source of actinic radiation, such as digital light processing (DLP), light emitting diodes (LED), and microLED technologies. It will be appreciated that the techniques described herein are not limited to the use of any particular technique or device for directing actinic radiation onto a liquid photopolymer, and as such the particular light source described in the example of FIGS. 1A-1C is provided merely as an illustrative example.

Irrespective of which technique is used to direct actinic radiation onto the liquid photopolymer, a separation process is typically conducted after curing so as to break any bonds that may have been produced between the cured material of layer 114 and the bottom of container 106. Various techniques may be employed to separate the layers, include rotation and/or sliding the container relative to the build platform. As one example, build platform 104 may be moved away from the container to reposition the build platform for the formation of a new layer and/or to impose separation forces upon any bonds between cured and/or partially cured material and the bottom of the container. In some implementations, the container 106 may be mounted onto a support base such that the container can be moved along a horizontal axis of motion (left or right in FIG. 1B) to introduce additional separation forces.

Separation of a part from a surface, as used herein, refers to the removal of adhesive forces between the part and the surface (i.e. the surface of a container, the surface of a supporting liquid, etc.). It may therefore be appreciated that, as used herein, a part and a surface may be separated via the techniques described herein, though immediately subsequent to the separation may still be in contact with one another (e.g., at an edge and/or corner) so long as they are no longer adhered to one another. For instance, relative motion between a newly formed layer of material and the surface of a container may overcome chemical and mechanical adhesive forces between the liquid photopolymer and the cured photopolymer, yet the layer may still be in physical contact with the container once the adhesion has been overcome.

Some conventional additive fabrication devices have addressed bonding between a cured layer of material and a container surface by seeking to reduce the strength of the bond by inhibiting the curing process adjacent to the surface and/or by making the surface very smooth, adding an elastic coating material, and or forming the bottom of the container from a film or coated film with reduced adhesive properties in contact with resin. In some cases, conventional additive fabrication devices have found that including a second liquid in between the liquid photopolymer and the container may further reduce and minimize adhesive forces. The immiscible liquid layer acts as a supportive substrate for the liquid photopolymer. In this way, a cured layer of the forming object may be removed from the liquid-liquid interface, rather than peeled from the container. The addition of this supporting liquid may make it easier to separate the cured photopolymer of the newly forming object from a surface because the supporting liquid is less rigid than the solid container and because the cured photopolymer may adhere to the liquid less than it would to the container.

However, conventional devices that employ this liquid-liquid configuration may suffer from various deficiencies. In particular, such devices may not provide a consistent and even layer of photopolymer at the interface due to movement or turbulence of both liquids. Without the constraint of a rigid bottom surface or tensioned film, it may take undue time for the two liquids to settle into a suitable state (e.g., reach equilibrium) for forming a new layer of material as a result of their fluid properties. Such deficiencies may be further exasperated by using more viscous liquid photopolymers and/or attempting to form thinner layers of cured photopolymer.

The inventors have recognized and appreciated techniques that mitigate the above-described deficiencies in an additive fabrication device in which a liquid photopolymer is arranged over a supporting liquid by improving the surface of the supporting liquid upon which a solid layer of material is formed. In particular, such techniques may include arranging a thin film between the liquid photopolymer and supporting liquid supporting liquid to limit intermixing between the liquids and helps maintain a flat surface beneath the liquid photopolymer. Additionally, or alternatively, the techniques may include arranging a leveling element within the supporting liquid and which may be operated to level the liquid interface between the supporting liquid and liquid photopolymer.

According to some embodiments in which an additive fabrication device includes a film between a liquid photopolymer and a supporting liquid, the film may be coupled to the container and arranged over and in contact with the supporting liquid. In some cases, the film may be arranged to be under tension so that it provides a restorative force to level out the liquids on either side of the films. The film may present several advantages over conventional additive fabrication devices. Such advantages may include prevention of leakage of the supporting liquid into the liquid photopolymer, reduction or prevention of potential evaporation of the supporting liquid, and reduction and/or elimination of mixing of the supporting liquid and the liquid photopolymer which may allow for the use of supporting liquids that may otherwise be incompatible due to miscibility, density, and or reactivity to resin. However, other advantages are possible, as this disclosure is not so limiting.

For embodiments in which a leveling element is included in an additive fabrication apparatus, the leveling element may be configured to move through the supporting liquid along an upper surface of the supporting liquid. In operation, the leveling element may advantageously assist in producing a flat liquid-liquid interface between the liquid photopolymer and the supporting liquid. This may include removing any regions in which one liquid protrudes partially into the other liquid at the liquid-liquid interface.

During operation of an additive fabrication device comprising a supporting liquid and a liquid photopolymer, a distortion region may form upon introduction or removal of a part into the container holding the liquid photopolymer and the supporting liquid. Such a distortion region may represent a region with a greater-than-desired thickness of liquid photopolymer resin or supporting liquid, and may be referred to as a "bulge." Proceeding with curing of the photopolymer without removing or otherwise addressing this bulge may result in layers of inconsistent thickness, resulting in unwanted distortion in the part and/or failure of the fabrication process. Inclusion of a leveling element as described herein may minimize or eliminate this bulge. As a result, a substantially consistent thin film of liquid photopolymer between the interface and the lower surface of the part being formed may be produced.

Following below are more detailed descriptions of various concepts related to, and embodiments of, techniques for improving the surface of a supporting liquid upon which a solid layer of material is formed by an additive fabrication device. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Referring now to FIGS. 2A-2H, additive fabrication device 200 comprises container 201 which holds a liquid photopolymer 206 and a supporting liquid 205. A part 202 is being fabricated on a build platform 203 from a plurality of layers of solid material formed by curing selected portions of the liquid photopolymer 206. The additive fabrication device 200 also includes a leveling element 207 arranged at least partially within the supporting liquid 205.

In operation, actinic radiation may be directed from a source (not shown) through a portion of the bottom of the container 201 to cure selected portions of the liquid photopolymer 206. Accordingly, in some embodiments, the bottom of container 201 may include at least one region that is transparent to the actinic radiation produced by the source. Furthermore, the supporting liquid 205 may also be transparent to the actinic radiation produced by the source.

In some embodiments, the supporting liquid 205 and liquid photopolymer 206 may be selected such that they are immiscible. This may advantageously prevent mixing of the supporting liquid and the liquid photopolymer, which may in turn aid in producing a flat liquid-liquid interface. In some embodiments, supporting liquid 205 may be comparatively non-polar while the liquid photopolymer 206 may be comparatively polar to ensure (or otherwise promote) immiscibility between the two components. A non-polar solvent, as referred to herein, may have a measured dielectric constant (c) of at least zero but no greater than 20, while a polar solvent may have a dielectric constant greater than 20. According to some embodiments, the supporting liquid may comprise an inert fluorocarbon-based fluid (e.g., a Fluorinert™), corn syrup, salt water, Epsom salt water, glycerol, Novac™ 7000, heavy water, or combinations thereof. It will be appreciated that while a supporting liquid is described herein, in general other fluids (including non-liquids) may also be suitable, in at least some cases.

According to some embodiments, supporting liquid 205 may be at least as dense as liquid photopolymer 206. In the example of FIGS. 2A-2H, this arrangement may allow the supporting liquid to remain adjacent to the bottom of the container, while the liquid photopolymer is on top of the supporting liquid, closer to the build platform, since the less dense liquid may remain on the top. Additionally, in some cases such relative densities may promote or may ensure the formation of a flat interface surface 204 between the liquid photopolymer 206 and the supporting liquid 205.

Figure 2B:
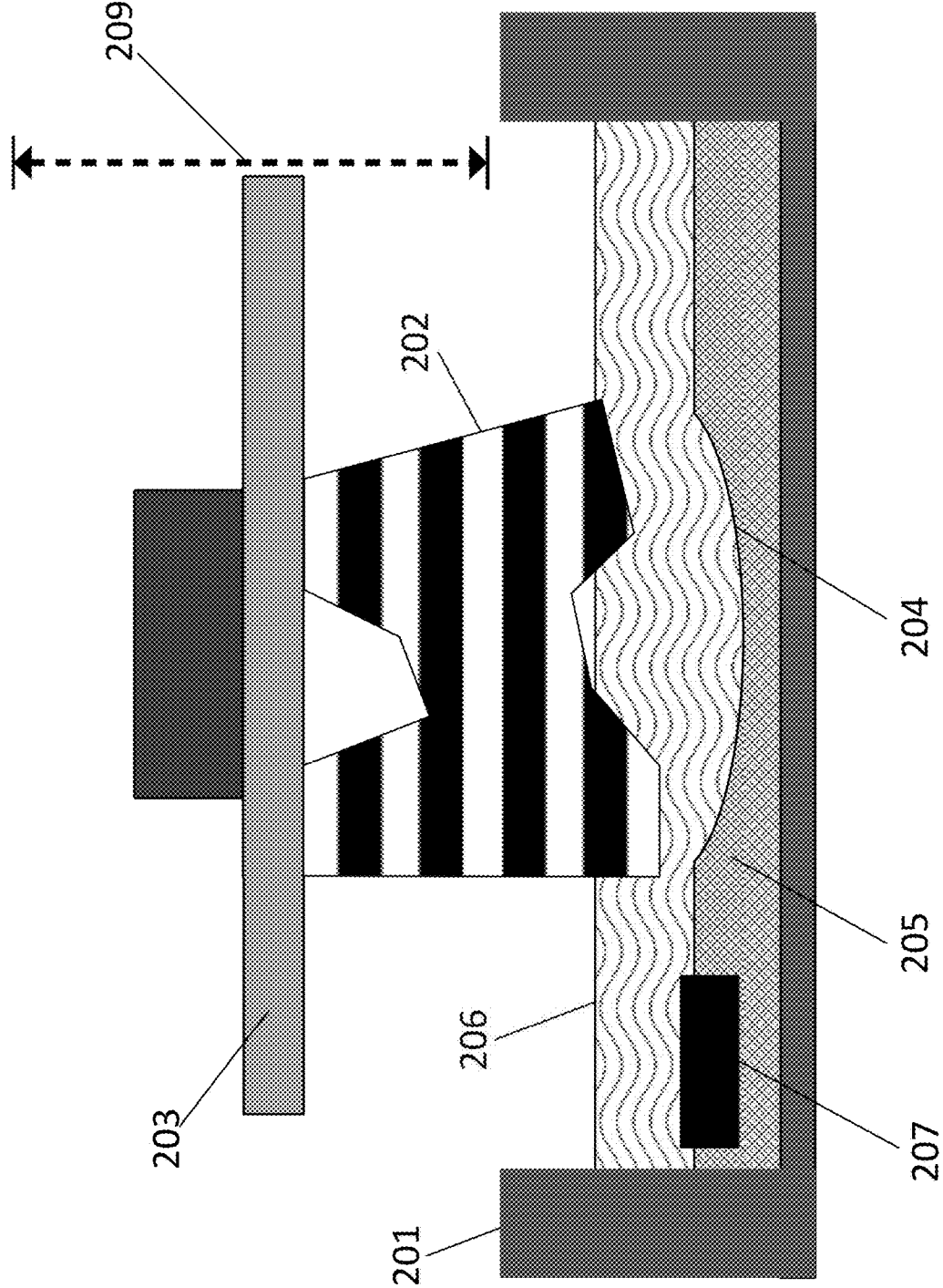

In the example of FIGS. 2A-2H, the leveling element 207 may be configured to promote the generation of a flat interface between the liquid photopolymer 206 and the supporting liquid 205 in the following manner. By way of example and not limitation, FIG. 2B shows the leveling element 207 positioned to the left of a bulge at the interface 204 formed by part 202. As discussed above, a bulge as shown in FIG. 2B may for instance occur due to fluid displacement by the part 202 (e.g., pushing of the liquid photopolymer 206 and/or the supporting liquid 205 toward the bottom of the container 201) and/or by other forces produced in the fluid such as recoil after the separation of the newly formed layer.

Some conventional additive fabrication devices do not directly address such a bulge in that the devices are configured to simply wait for the liquids to find equilibrium before forming a layer, thereby potentially limiting the types of liquids that may be used and increasing the time required to complete the printing process. Alternatively, some conventional additive fabrication devices have sought to accelerate the process of fluid equalization by performing a sequence of motions in which the part is lowered by the build platform towards and away from the supporting liquid 205 before finding a final position. In each case, however, additional time must be spent either waiting or moving the build platform to ensure that a flat surface is presented for forming a layer of material from the liquid photopolymer.

In contrast, the leveling element disclosed herein may promote a flat surface by smoothing out the bulge to at least some extent, which may reduce or eliminate the wait time needed for the liquids at the interface to reach equilibrium, and/or the wait time associated motion of the build platform being used to restore equilibrium of the two liquids at the interface.

Subsequent to the arrangement shown in FIG. 2B, the leveling element 207 may then move towards the bulge at interface 204, as illustrated in FIG. 2C, and may interact with the interface 204 to smooth the bulge, to at least some degree. In some embodiments, motion of the leveling element through the bulge may form a substantially flat region of the interface 204 in an area trailing the leveling element as it moves through the region formerly occupied by the bulge. A result of such a process may be seen in FIG. 2D, wherein a flat interface 204 has been produced. It will be appreciated that a flat interface 204 may be produced by one or more passes of the leveling element 207 alone or in conjunction with a wait period to achieve the desired flat interface. In some embodiments the leveling agent may move through the bulge region just once, in other cases the leveling element may be moved through the bulge region two or more times.

Figure 2E:
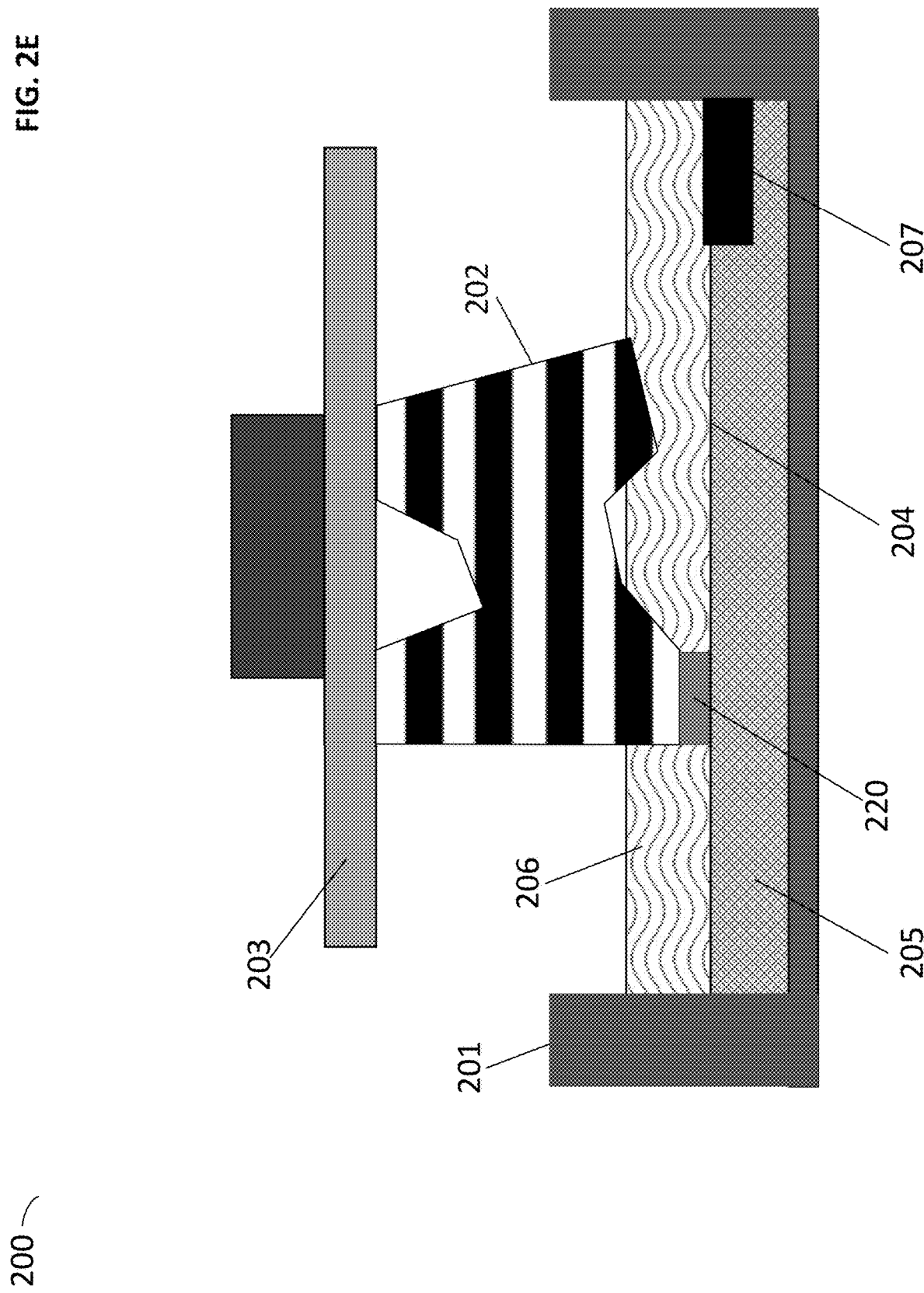
Figure 2F:
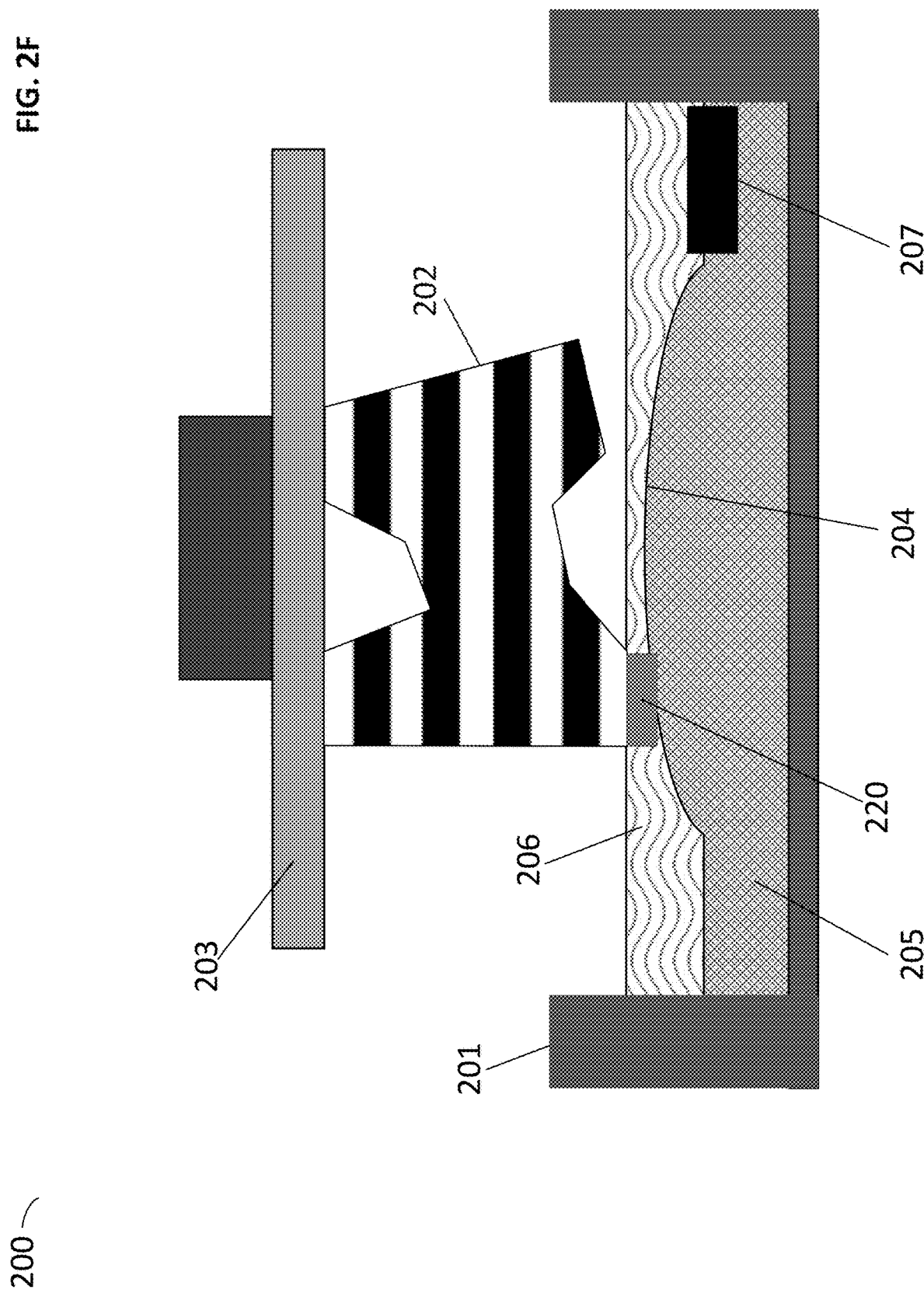
Figure 2G:
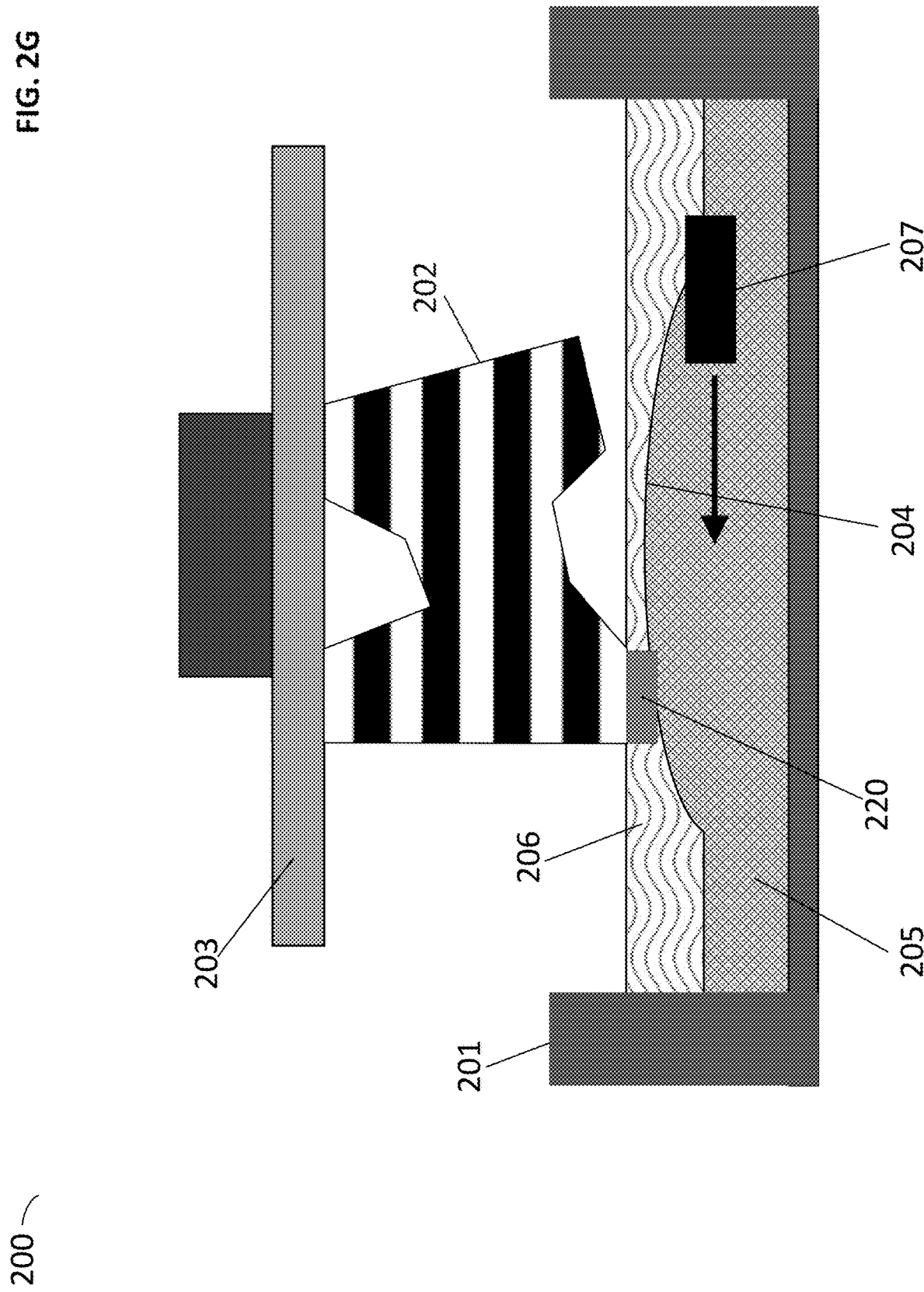
Figure 2H:
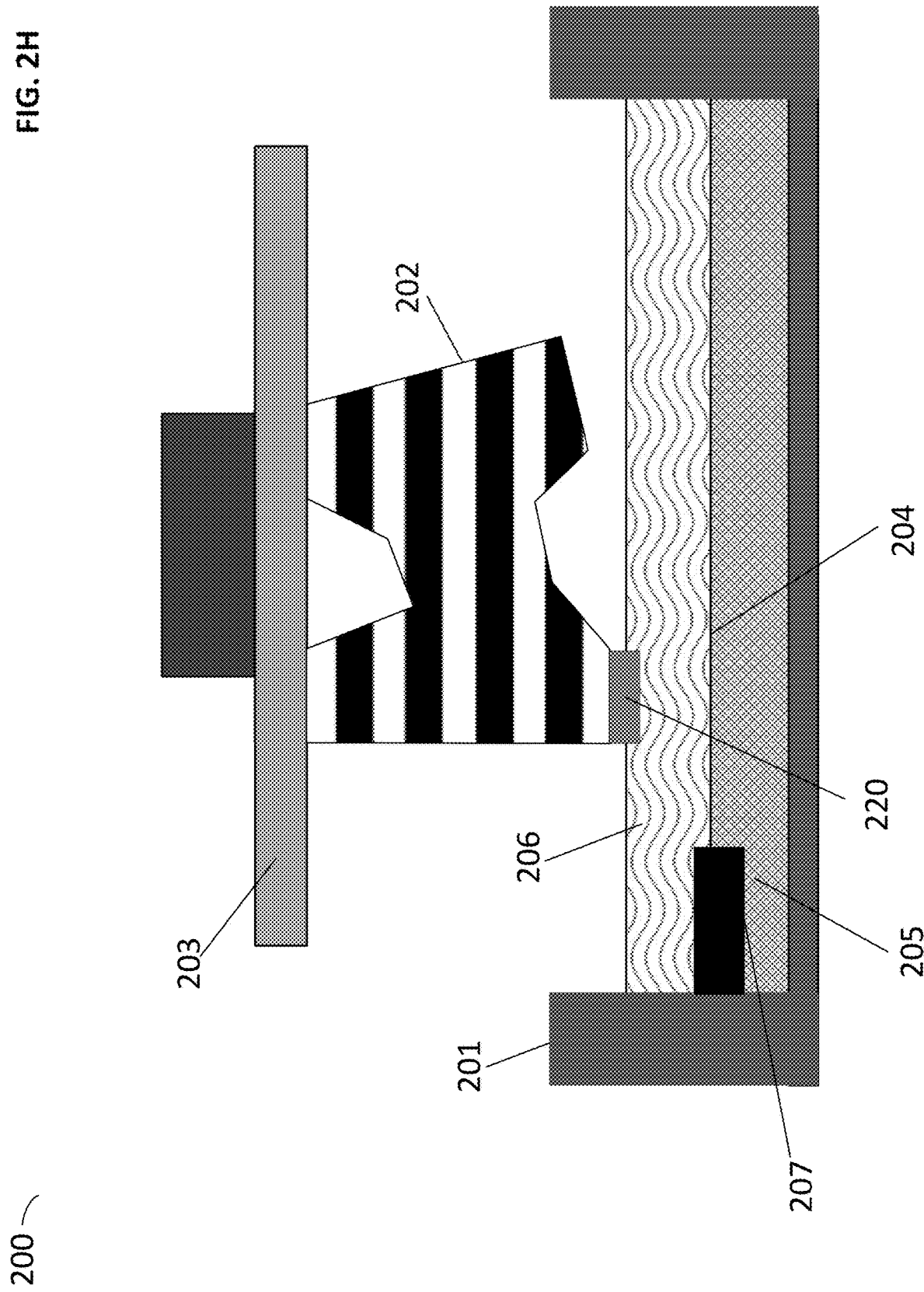

Subsequent to the arrangement shown in FIG. 2B, a new layer of material 220 may be cured on to part 202, as seen in FIG. 2E, and as the build platform 203 raises the part 202 from the liquid photopolymer 206, a bulge may form at interface 204 as shown in FIG. 2F. The leveling element 207 may, according to some embodiments, move towards the left, depicted in FIG. 2G, in order to smooth the bulge at the interface 204 and return to its position on the left of the container, seen in FIG. 2H, and the process of additive fabrication can continue, for example, starting again at FIG. 2A. The leveling element 207 may produce this effect in addition to, or alternatively to, the above-described liquid features that may also promote the generation of a flat interface (e.g., immiscibility, relative densities).

The leveling element 207, according to some embodiments, may be positioned entirely within the supporting liquid 205, or may be positioned at least partially within the liquid photopolymer 206. In some cases, the leveling element may be positioned both within the supporting liquid and the liquid photopolymer such that it is at the interface of the two liquids, as seen in FIGS. 2A-2H. In certain cases, the leveling element is positioned proximate to the interface of the supporting liquid and the liquid photopolymer. In some embodiments, the leveling element may be positioned such that a flat edge (such as an upper surface of the leveling element) is positioned to align with the interface between the supporting liquid and the liquid photopolymer. In some embodiments, the leveling element may configured to move above the supporting liquid, such that it contacts the upper surface of the supporting liquid. Other positions of the leveling element may be possible, as this disclosure is not so limiting. In each of the above-described positions of the leveling element, it will be appreciated that in some embodiments the additive fabrication device 200 may be configured to move the leveling element vertically within the container, and as such the different positions of the leveling element may be produced within a single device.

According to some embodiments, the additive fabrication device 200 may be configured to move leveling element 207 along an axis that is parallel to the bottom of container 201. For instance, FIG. 2A shows leveling element 207 configured to move along axis 210, which is parallel to the bottom of container 201. As part 202 forms by layer-by-layer addition of cured liquid photopolymer, the leveling element 207 may move along an axis 210 as the build platform 203 moves the part 202 along the axis 209. The leveling element 207 may be configured to move below the interface (not pictured) or along the interface 204, as illustrated in FIG. 2C.

According to some embodiments, leveling element 207 may be coupled to one or more actuators that may be operated by the additive fabrication device 200 to move the leveling element. Such a coupling may include direct coupling, such as via mechanical coupling between the one or more actuators and the leveling element, or may include indirect coupling, such as via magnetic elements coupled to the one or more actuators and coupled to the leveling element, such that the leveling element may be moved through motion of the magnetic elements coupled to the one or more actuators. Examples of suitable leveling elements coupled magnetically to the additive fabrication apparatus described herein may include mixing elements disclosed in U.S. Patent Application No. 62/818,963, titled "Techniques for Mixing in Additive Fabrication and Related Systems and Methods," which is hereby incorporated by reference in its entirety.

In some embodiments, the leveling element 207 may comprise a wiper, a fin, a blade, and/or any structure suitable for smoothing the interface between the supporting liquid and the liquid photopolymer. The leveling element may have various shapes and/or be comprised of multiple components. The shape may be configured to be hydrodynamic as it moves through the supporting liquid and/or the liquid photopolymer. The shape may have a flat top surface. When the leveling element comprises a wiper, non-limiting examples of suitable wipers which may be used as leveling elements include those disclosed in U.S. Pat. No. 10,207,453, titled "Techniques for Surface Preparation During Additive Fabrication and Related Systems and Methods," which is hereby incorporated by reference in its entirety. According to some embodiments, more than one leveling element may be present. For example, the addition of more than one leveling element may enhance the speed in which the interface between the supporting liquid and the liquid photopolymer is smoothed (i.e., the speed in which the bulge at the interface is smoothed) such that additive fabrication may proceed at a faster rate. Additionally, or alternatively, one or more wipers may be operated to move in a bulk manner to quickly resolve the bulge, and one or more wipers additional wipers may then perform a more precise smoothing of the liquid interface.

According to some embodiments, the leveling element may move at any speed sufficient to level the interface between the liquid photopolymer and the supporting liquid. In some cases, it may be desirable for the leveling element to move as fast as possible while producing the desired effect upon the liquid-liquid interface. In some embodiments, the leveling element is configured to move at a sufficiently slow speed as to minimize or prevent flow of a liquid (e.g., a liquid photopolymer, a supporting liquid) on the trailing side of the leveling element.

In some embodiments, the leveling element may comprise a material that is non-wetting with respect to the liquid photopolymer so that the liquid photopolymer does not adhere to the surface of the leveling element. Therefore, the leveling element may comprise a material that is non-wetting with respect to both the liquid photopolymer and the supporting liquid. This may be referred to as "resin-phobic" in the same manner as materials that are non-wetting with respect to water are "hydrophobic." In some embodiments, the leveling element may comprise one or more polymers including, but not limited to, polymethylpentene (PMP), fluorinated ethylene propylene (FEP), ethylene tetrafluoroethylene (ETFE), perfluoroalkoxy alkane (PFA), ultra-high-molecular-weight polyethylene (UHMWP), or combinations thereof. In some embodiments, the leveling element may be coated with a non-wetting material, such as PTFE (polytetrafluoroethylene, or Teflon™), as a non-limiting example. In some embodiments, a top side of the leveling element and a bottom side of the leveling element comprise different materials.

According to some embodiments, the liquid photopolymer and/or the supporting liquid may have a certain dimension. For example, the supporting liquid may have a particular height within the container. In some embodiments, the wiper may have a certain thickness. In some embodiments, the ratio of the height of the supporting liquid to the thickness of the wiper is around 2:1. As may be appreciated, it is desirable to minimize the height of the supporting liquid to cover the wiper, while limiting the total volume of supporting liquid required. The wiper height should be selected so as to limit the flow of the supporting liquid around/under the wiper as it moves through the container.

The leveling element 207 may be any shape suitable for wiping, such as a shape with a flat upper surface. In some embodiments it may be preferable to use a shape that moves more easily through a liquid to minimize splashing or additional movement of either liquid, such as a wiper that is rounded in shape to promote better hydrodynamics of the leveling element.

According to some embodiments, the leveling element 207 may include a flow limiting structure. In some cases, when the leveling element is moved through a bulge at the interface between the supporting liquid and the liquid photopolymer, an undesirable flow may be created on the trailing side of the leveling element. A flow limiting structure may be configured to minimize or eliminate this undesirable flow of the supporting liquid and/or the liquid photopolymer as the leveling element moves through the supporting liquid and/or the liquid photopolymer.

Figure 3A:
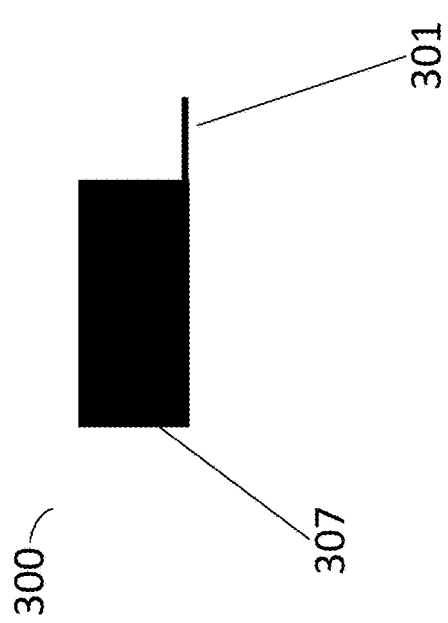
FIGS. 3A-3B depict schematic illustrations of leveling elements configured with a flow catch, according to some embodiments.
Figure 3B:
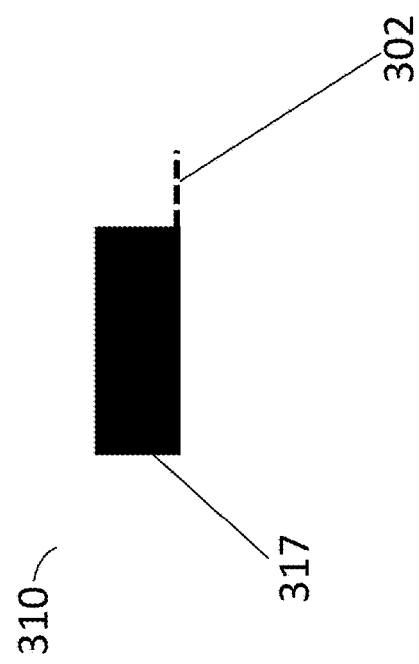

Referring specifically to FIGS. 3A-3B, FIG. 3A illustrates a leveling element 300 configured with a flow limiting structure referred to herein as a "flow catch" 301. In the example of FIG. 3A, the leveling element 300 includes a primary structure 307 in addition to flow catch 301. The primary structure 307 may have any suitable shape or size and is not limited to the shape depicted in the example of FIG. 3A.

In some embodiments, a flow catch may be perforated, as illustrated in FIG. 3B, which depicts leveling element 310 that includes a primary structure 317 and a perforated flow catch 302. Perforations along the flow catch 302 may advantageously provide additional control of fluid (e.g., supporting liquid and/or liquid photopolymer) flow around and/or through the flow catch. Without wishing to be bound by theory, fluid at the liquid-liquid interface may not be drawn through the perforations due to the viscosity of the supporting liquid and the surface tension between the two fluids.

Figure 4A:
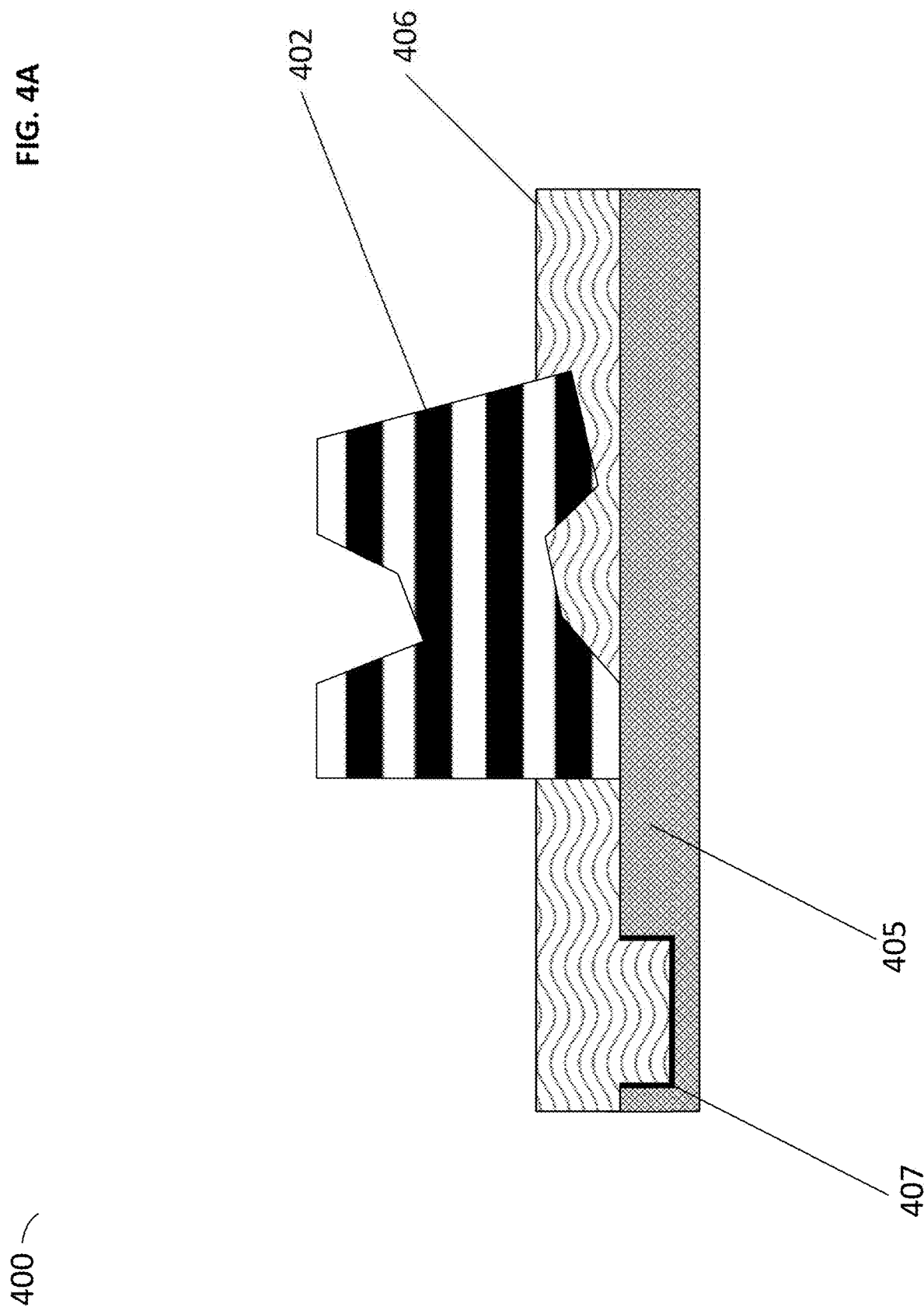
Figure 4B:
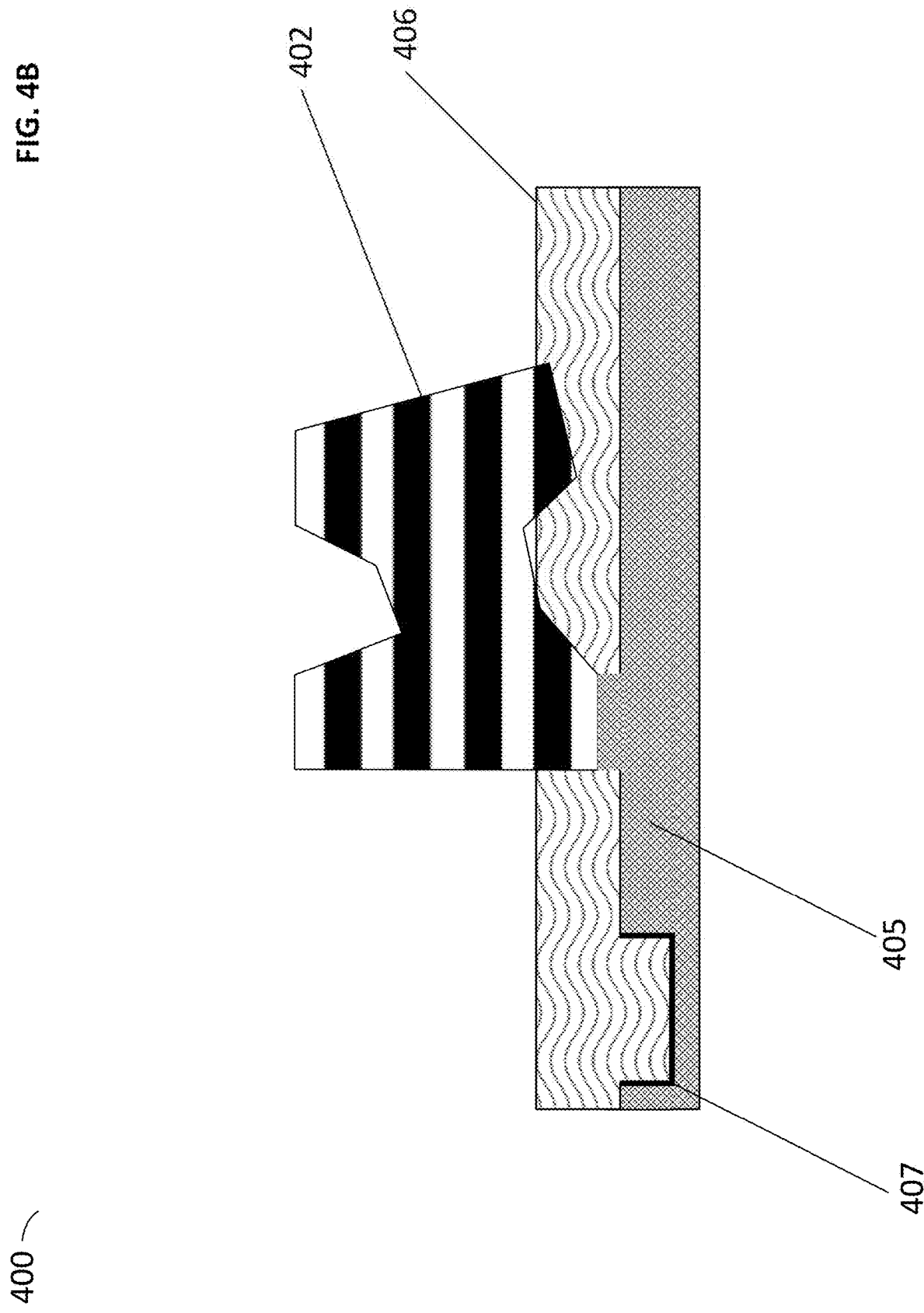

In some embodiments, the leveling element may apply suction to assist in creating or maintaining a level interface between the supporting liquid and the liquid photopolymer. The use of suction may help to redistribute the liquid photopolymer into a flat surface after a layer has been cured. Referring now to FIGS. 4A-4F, part 402 is being formed by liquid photopolymer 406, which is supported by supporting liquid 405. The container and build platform are not pictured for clarity. Leveling element 407 is configured to provide a level interface between the supporting liquid 405 and the liquid photopolymer 406. As a result of the part being moved away from the supporting liquid subsequent to forming a new layer of material, a distortion in the surface of the supporting liquid 405 may form between the part 402 and the liquid photopolymer 406, as illustrated in FIG. 4B. The viscosity of the liquid (and/or another liquid property) may slow the rate at which the supporting liquid and liquid photopolymer return to equilibrium and suction forces generated by the leveling element 407 may assist in redistributing the liquids across the interface, in addition to helping to level the interface of the supporting liquid and the liquid photopolymer.

Figure 4C:
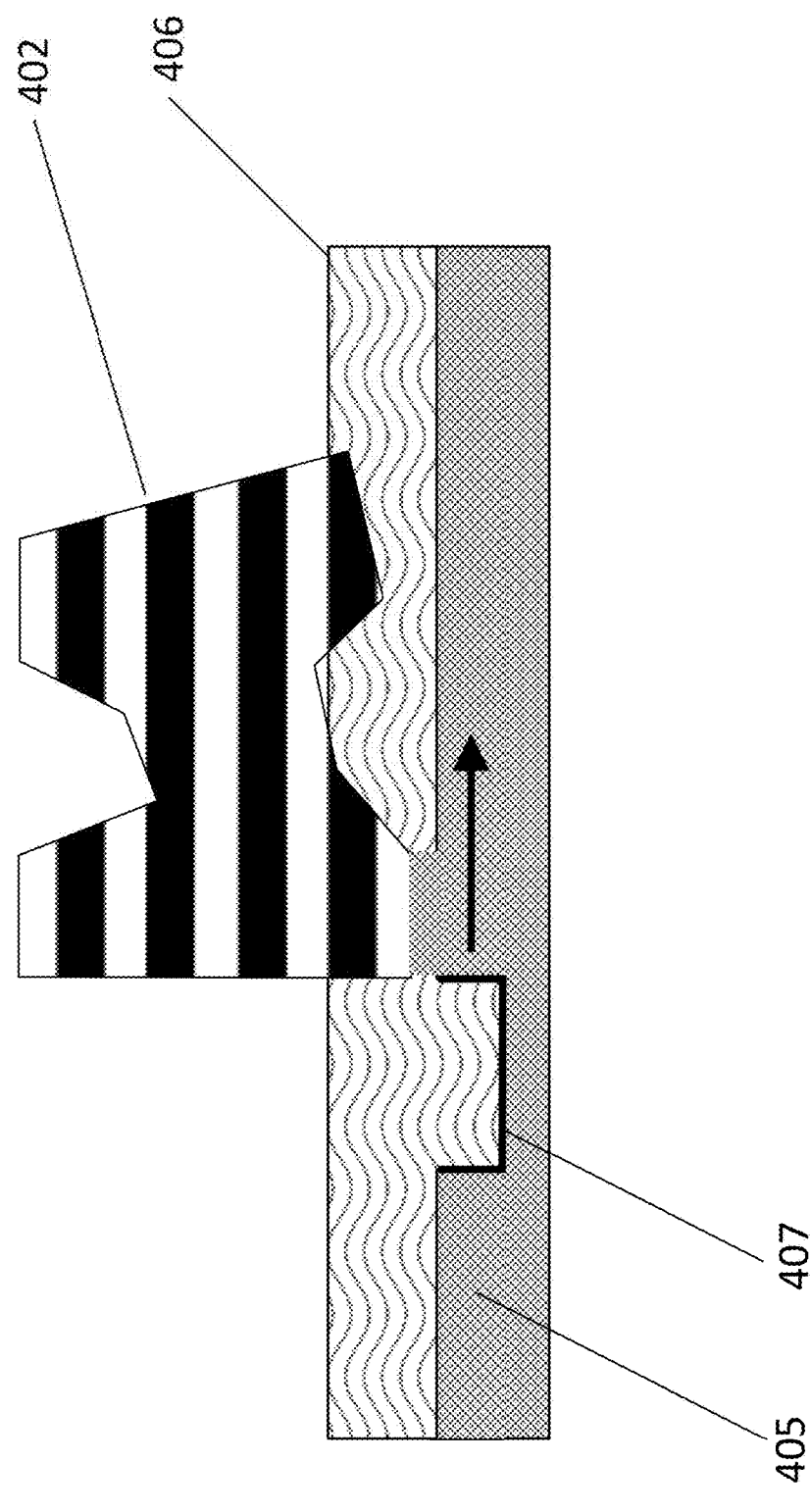
Figure 4D:
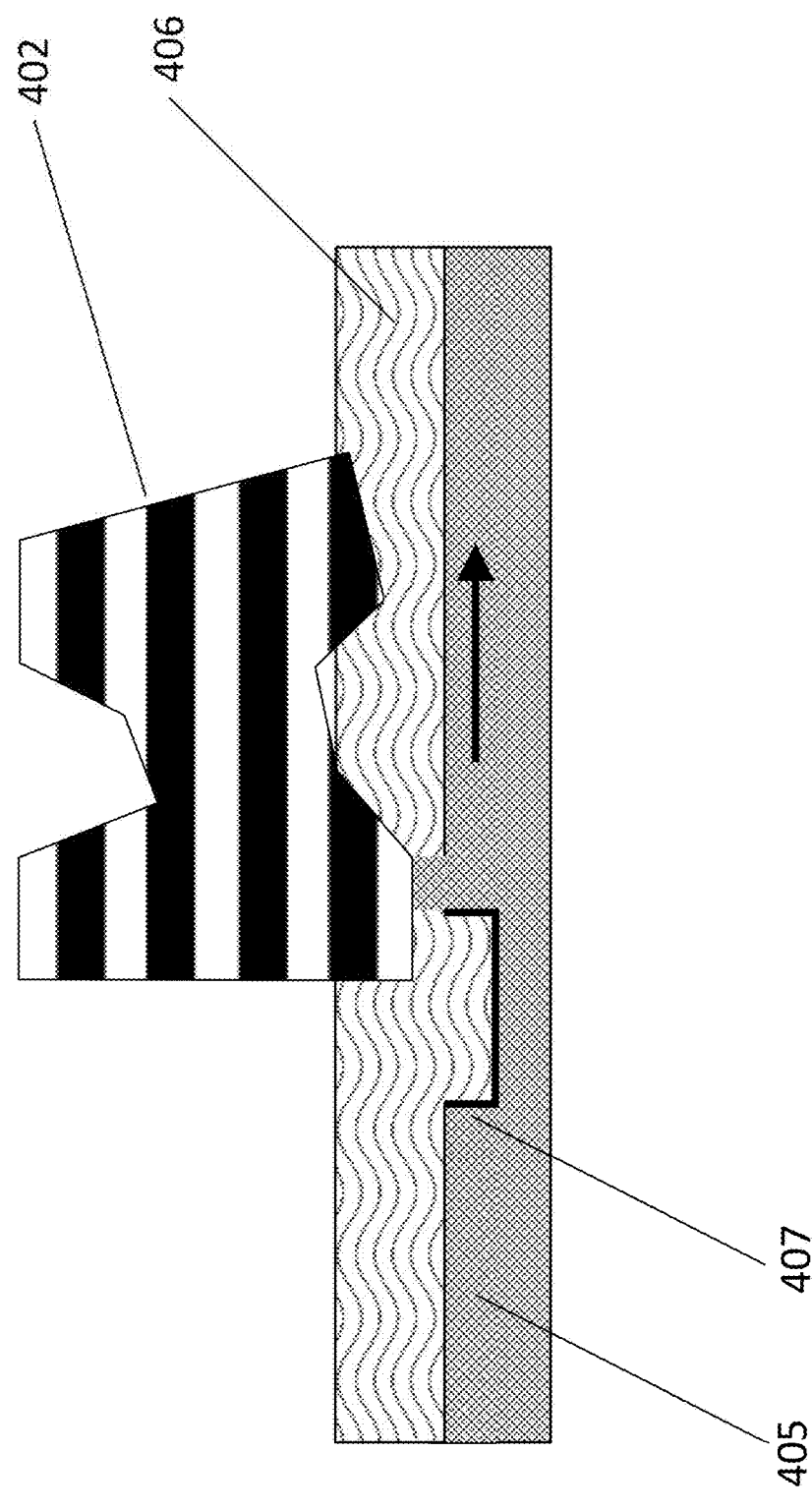
Figure 4F:
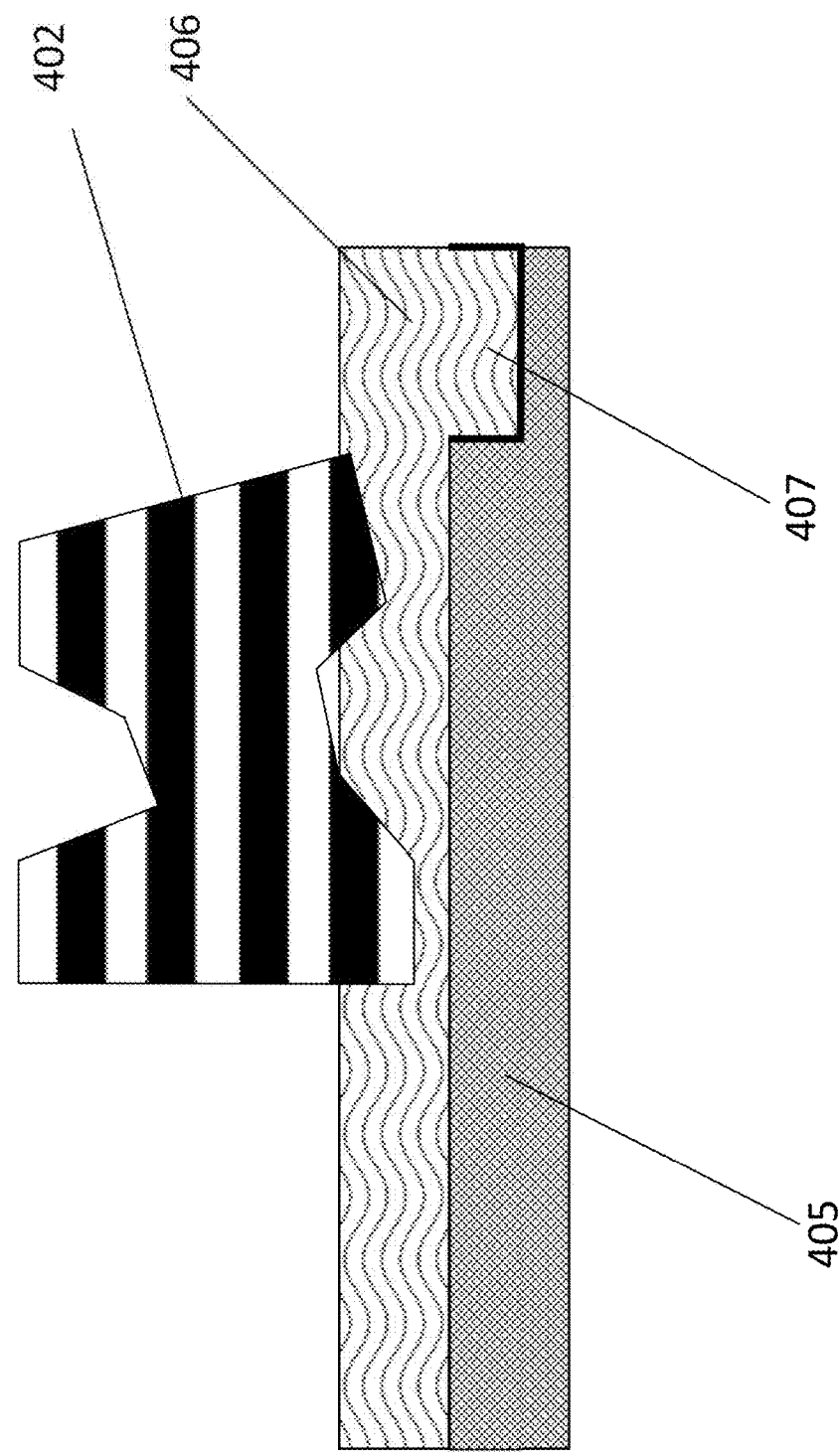

Subsequent to the arrangement shown in FIG. 4B, the leveling element may be operated by the additive fabrication device to move proximate to the interface of the supporting liquid 405 and the liquid photopolymer 406. As illustrated in FIGS. 4C-4D, this motion of the leveling element may level the surface of the supporting liquid at least in part due to the aforementioned suction provided by the leveling element. Moreover, the leveling element may, according to some embodiments, advantageously remove uncured liquid photopolymer from the part during this process in addition to leveling the surface of the supporting liquid. Leveling element 407 may then complete its motion and may end at a side of the container, as seen in FIGS. 4E-4F.

In some embodiments, the additive fabrication device may comprise a sensor configured to monitor the print plane by determining a height of the supporting liquid and/or a height of the liquid photopolymer. The sensor may be connected to a controller of the additive fabrication device, wherein the controller is configured to dynamically control various aspects of the additive fabrication device based on data received from the sensor. For example, the controller may operate the additive fabrication device to add more supporting liquid and/or more liquid photopolymer into the container, and/or may pause the additive fabrication process based on sensor data. Suitable sensors may include capacitive sensors, and/or floating sensors.

In some embodiments, an additive fabrication device may be configured with a film disposed between two fluids. As discussed above, arranging a thin film between the liquid photopolymer and a supporting liquid may limit intermixing between the two layers, may reduce the loss of supporting liquid due to evaporation or other means, and may help to maintain a flat surface beneath the liquid photopolymer.

Figure 5A:
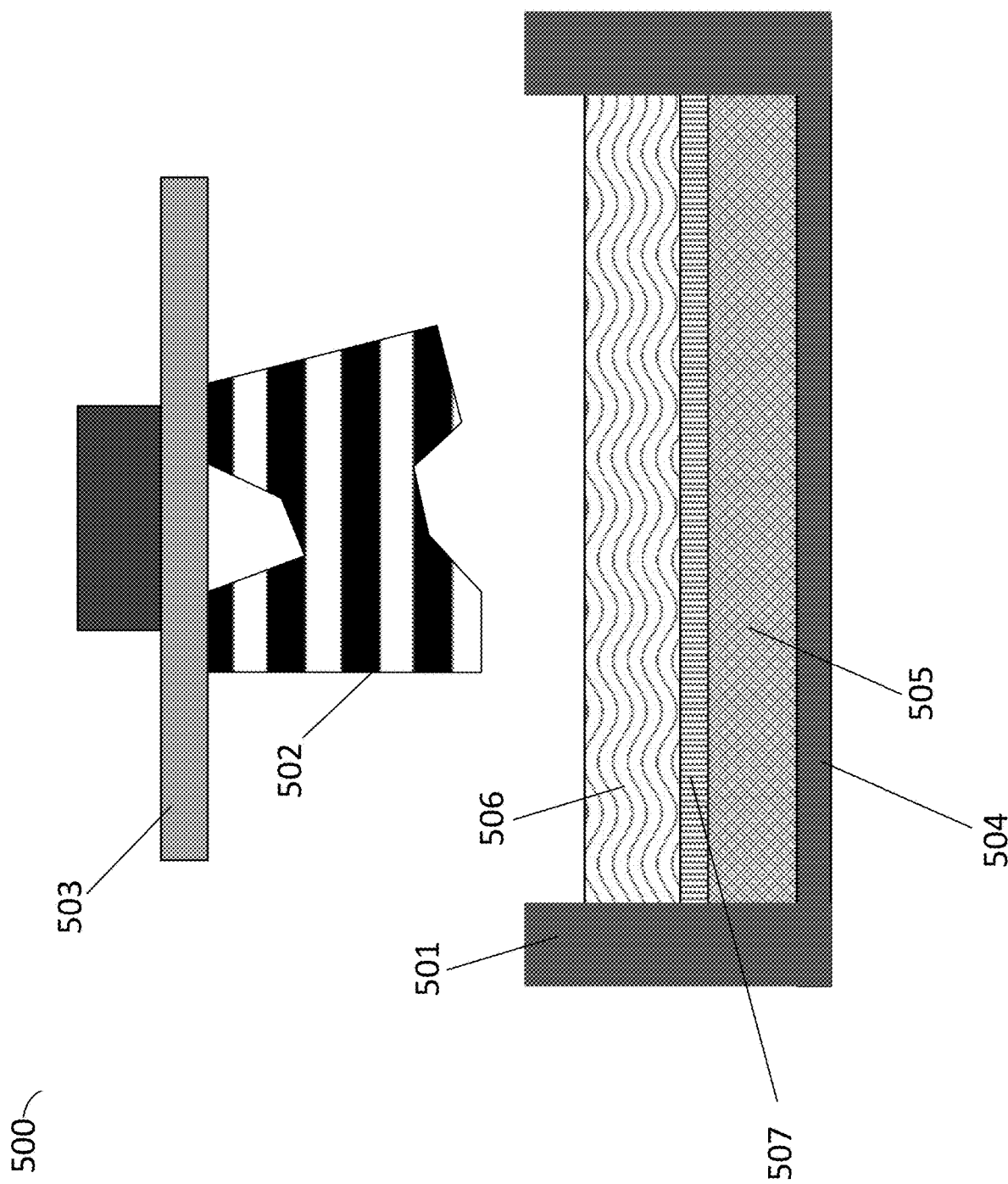
FIGS. 5A-5B illustrate additive fabrication devices configured with a film between two liquids, according to some embodiments.

FIG. 5A depicts an additive fabrication device in which a supporting liquid and a liquid photopolymer are separated by a film, according to some embodiments. Additive fabrication apparatus 500 comprises a container 501 and a build platform 503 mounted above the container 501 such that it may be raised and lowered. During operation, a solid object being formed 502 may be supported by a build platform 503. A supporting liquid 505 is held within the container by a film 507 and a liquid photopolymer 506 is located above film 507.

In some embodiments, the supporting liquid 505 and the liquid photopolymer 506 may be selected such that they are immiscible. In some embodiments, the supporting liquid 505 and the liquid photopolymer 506 may be selected such that the supporting liquid 505 is more dense than liquid photopolymer 506. In some embodiments, the fluid properties of the supporting liquid 505 and liquid photopolymer 506 may result in the formation of a relatively flat interface when the supporting liquid 505 and liquid photopolymer 506 are in equilibrium. The film 507 may be positioned between the supporting liquid 505 and liquid photopolymer 506 at equilibrium and remain relatively flat.

According to some embodiments, a tension force may be applied to the film 507 to help maintain a flat interface between the liquid photopolymer and the supporting liquid. For instance, the film 507 may be attached to the container (and/or any other structure) under tension. In some cases, the film may be tensioned along one axis (rather than across an area), which may thereby reduce forces acting upon a part during separation of the part from the film ("peel forces") as compared with conventional additive fabrication devices.

The use of film 507 between the supporting liquid 505 and the liquid photopolymer 506 may provide several advantages. Without wishing to be bound by theory, the supporting liquid underneath the film may provide flexibility in compression and/or tension which may provide for low peel forces. Moreover, the supporting liquid underneath the film may reduce forces that may be applied to the part due to a new layer of material being formed between the part and the film ("squish forces"). Another advantage may include the underlying supporting liquid preventing sagging of the film compared with additive fabrication devices in which the film is not supported. The film may also prevent leakage or evaporation of the supporting liquid, and may prevent intermixing between the supporting liquid and the liquid photopolymer.

It should be appreciated that the use of a film 507 as a separating film between a supporting liquid 505 and a liquid photopolymer resin 506 may reduce or avoid the need to select supporting liquid 505 and liquid photopolymer 506 that are immiscible or otherwise compatible with each other when placed in contact. In addition, the use of such a separating film may reduce any loss of supporting liquid 505 due to mechanical removal, such as within voids of the part 502 or due to evaporation.

According to some embodiments, the film 507 may comprise any suitable material as to act as a barrier between the supporting liquid and the liquid photopolymer. In some embodiments, the film comprises a polymer such as polytetrafluoroethylene (PTFE), polymethylpentene (PMP), fluorinated ethylene propylene (FEP), ethylene tetrafluoroethylene (ETFE), perfluoroalkoxy alkane (PFA), ultra-high-molecular-weight polyethylene (UHMWP), or combinations thereof. In some embodiments, a top side of the film and a bottom side of the film comprise different materials. For instance, the film may be formed from multiple layers of different materials, which may be attached to one another across their surface, attached only at an exterior edge or edges, or may not be directly attached to one another at all.

Figure 5B:
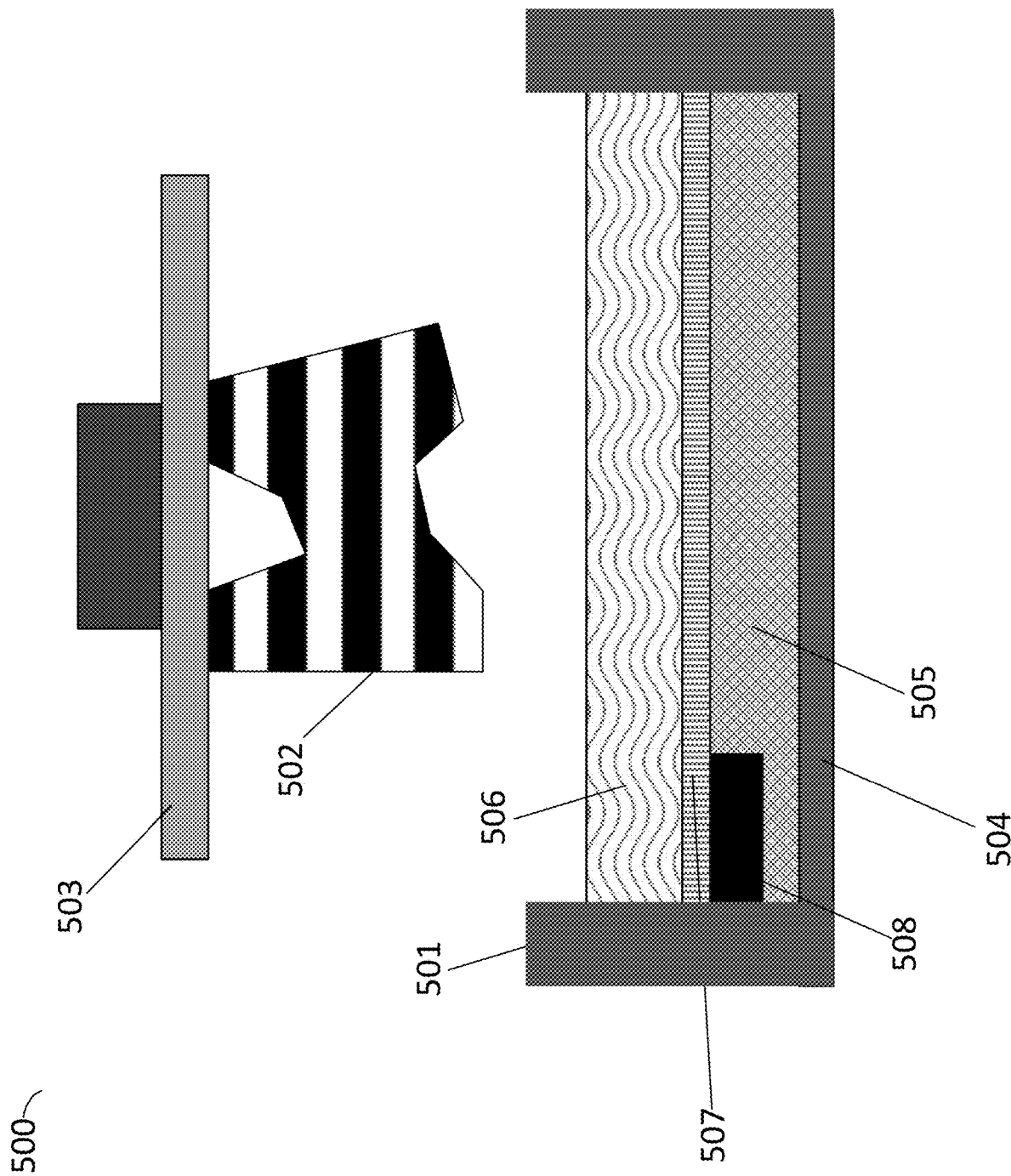

It should be noted that some embodiments may combine both a film and at least one wiper into a single additive fabrication apparatus. The benefits and advantages of an additive fabrication apparatus comprising a leveling element or a film (as described herein) over conventional additive fabrication devices and methods may be appreciated herein in an apparatus using a leveling element and a film proximate the interface of a liquid photopolymer and a supporting liquid. As shown in FIG. 5B, the leveling element 508 may be included along with film 507. The additive fabrication device may operate leveling element 507 to move the element across the interface proximate the bottom of the film 507 as discussed above in relation to FIGS. 2A-2H. In some embodiments the leveling element 508 may come into contact with the lower surface of the 507. As further discussed in relation to FIGS. 2A-2H, the motion of leveling element 508 may produce a flattened region between the liquid photopolymer and the supporting liquid.

As stated previously, a source of actinic radiation may be used to cure the liquid photopolymer, according to some embodiments. As a result, the supporting liquid, the liquid photopolymer and/or at least a portion of the container (e.g., the bottom of the container) may be transparent to at least some actinic radiation. In some embodiments, the source of actinic radiation is a laser with a characteristic wavelength of 405 nm. Thus, according to some embodiments, the liquid photopolymer, the supporting liquid, and at least a portion of container may be transparent to light of wavelength 405 nm. However, those of ordinary skill in the art will be capable of selecting an appropriate source of actinic radiation and selecting a container, a liquid photopolymer, and a supporting liquid that are transparent to this radiation.

Apparatus described herein may be equipped with additional features, aside from a leveling element and/or a film, to aid in smoothing or leveling the interface between the supporting liquid and the liquid photopolymer. According to some embodiments, an additive fabrication device may comprise one or more heaters and/or coolers configured to aid in smoothing and/or leveling the interface. For instance, a heater may be arranged externally to the container and/or the container may be equipped with a temperature sensor and/or a heating element to provide heat to the supporting liquid. Providing heat to the supporting liquid and/or the liquid photopolymer may lower the viscosity of the liquid(s) helping to more quickly restore a flat interface between the two liquids. And in some embodiments, a cooler may be arranged within the container and/or may be arranged externally to the container to cool liquids within the container and to thereby promote flattening of the interface. Cooling of the supporting liquid may make it less likely to deform (e.g., as a result of higher viscosity) thus helping to prevent the formation of a bulge during additive fabrication.

It should be appreciated that although embodiments above describe a physical leveling element, some embodiments may use other forces to remove a bulge in a liquid-liquid interface. According to some embodiments, an additive fabrication device may be configured to introduce horizontal flow by adding and/or removing a material, such as removing supporting liquid from the container, such that the bulge is sheared away. For instance, the additive fabrication device may include a pump configured to introduce motion of the supporting liquid through the container. Such motion may aid in removing a bulge or other non-uniformity in the interface between the supporting liquid and liquid photopolymer (which may or may not comprise a film).

In some embodiments, an additive fabrication device may include one or more sonic and/or ultrasonic devices arranged to apply sound toward or within the container. Sonication and/or ultrasound, when applied to the supporting liquid and/or liquid photopolymer, may reduce a size of the bulge or may otherwise aid in providing a level interface. In yet another embodiment, the build platform may move or slide the part to facilitate leveling the interface. In yet another embodiments, the additive fabrication device may be configured to move or oscillator the container to assist in leveling the interface.

Figure 6:
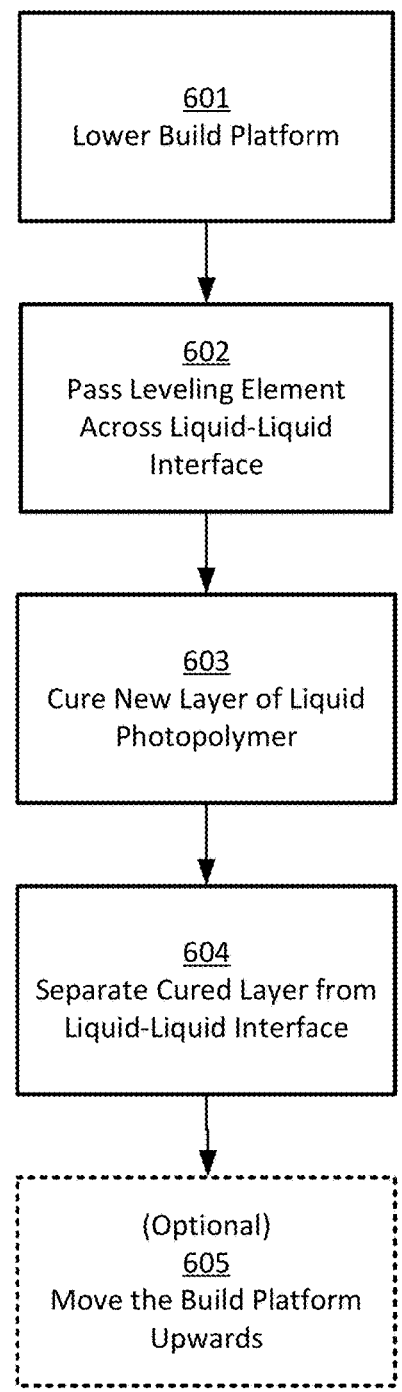
FIG. 6 illustrates a flow chart of a process suitable for smoothing a liquid-liquid interface during additive fabrication, according to some embodiments.

FIG. 6 is a flowchart of a method of leveling a bulge when using an additive fabrication apparatus using a liquid-liquid interface, according to some embodiments. Method 600 may be performed by any suitable combination of computing system(s) and/or additive fabrication device(s), an example of which is provided in FIG. 6 described below.

In act 601, a build platform is lowered proximate a liquid photopolymer in a container, such as build platform 203 and liquid photopolymer 206 in container 201. For the first layer, the build platform 203 may be lowered directly into the liquid photopolymer. For additional layers after the first layer, the build platform lowers a partially formed part into the liquid photopolymer, such as part 202, illustrated in FIG. 2B. As discussed previously, a bulge may form at the interface of the supporting liquid and the liquid photopolymer as a result of lowering the build platform into the liquid photopolymer and/or the forming of a layer on the part, as illustrated in FIG. 2B.

In act 602, a leveling element, such as leveling element 207, may pass through, or proximate to, the bulge as to smooth, flatten, or level the interface. This may produce a level interface between the liquid photopolymer and the supporting liquid so that the next layer of the liquid photopolymer may be easily cured onto the forming part.

In act 603, a new layer of the liquid photopolymer is cured onto the part being fabricated by passing a source of actinic radiation (e.g., a laser) through a transparent portion of the container.

In act 604, the cured layer on the part being fabricated may be separated from the liquid-liquid interface. Separation may occur, for example, by raising the build platform upwards, by moving the container sideways, and/or through any other relative motion between the supporting liquid and the newly formed layer.

In act 605, the build platform may optionally be raised upwards away from the liquid photopolymer. This permits, under the effect of gravity, the liquid photopolymer to be replenished beneath the build platform and the part. Upon raising the build platform, a new bulge may form in which the leveling element may be used to smooth this bulge, as in act 602.

Figure 7:
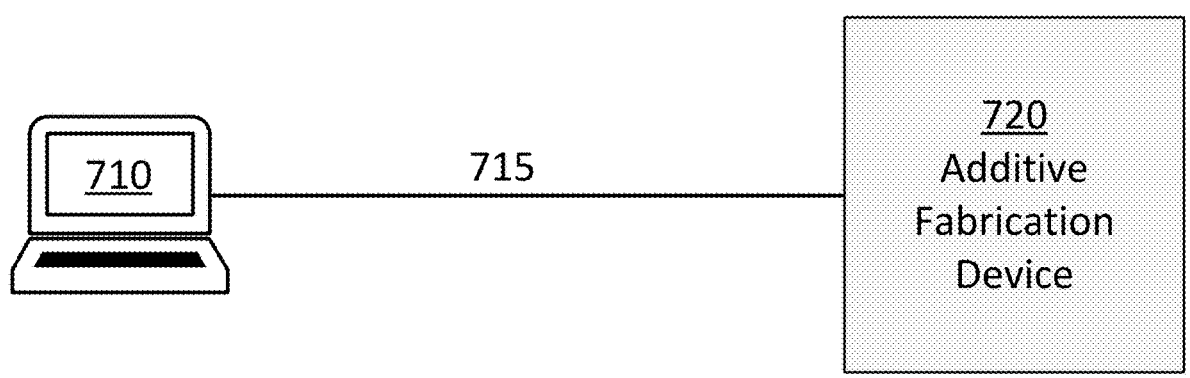
FIG. 7 illustrates an example of a computing system environment on which aspects of the invention may be implemented.

FIG. 7 is a block diagram of a system suitable for practicing aspects of the invention, according to some embodiments. System 700 illustrates a system suitable for generating instructions to perform additive fabrication by an additive fabrication device and subsequent operation of the additive fabrication device to fabricate a part. For instance, instructions to fabricate a part and operate a leveling element to level a liquid-liquid interface may be generated by the system and provided to the additive fabrication device.

It will be appreciated that any of the above-described techniques to smooth a liquid-liquid interface during additive fabrication may be combined in any suitable manner and in any suitable order. According to some embodiments, computer system 710 may execute software that generates instructions for fabricating a part using additive fabrication device, such as method 600 shown in FIG. 6. Said instructions may then be provided to an additive fabrication device, such as additive fabrication device 720, via link 715, which may comprise any suitable wired and/or wireless communications connection. In some embodiments, a single housing holds the computing device 710 and additive fabrication device 720 such that the link 715 is an internal link connecting two modules within the housing of system 700.

Figure 8:
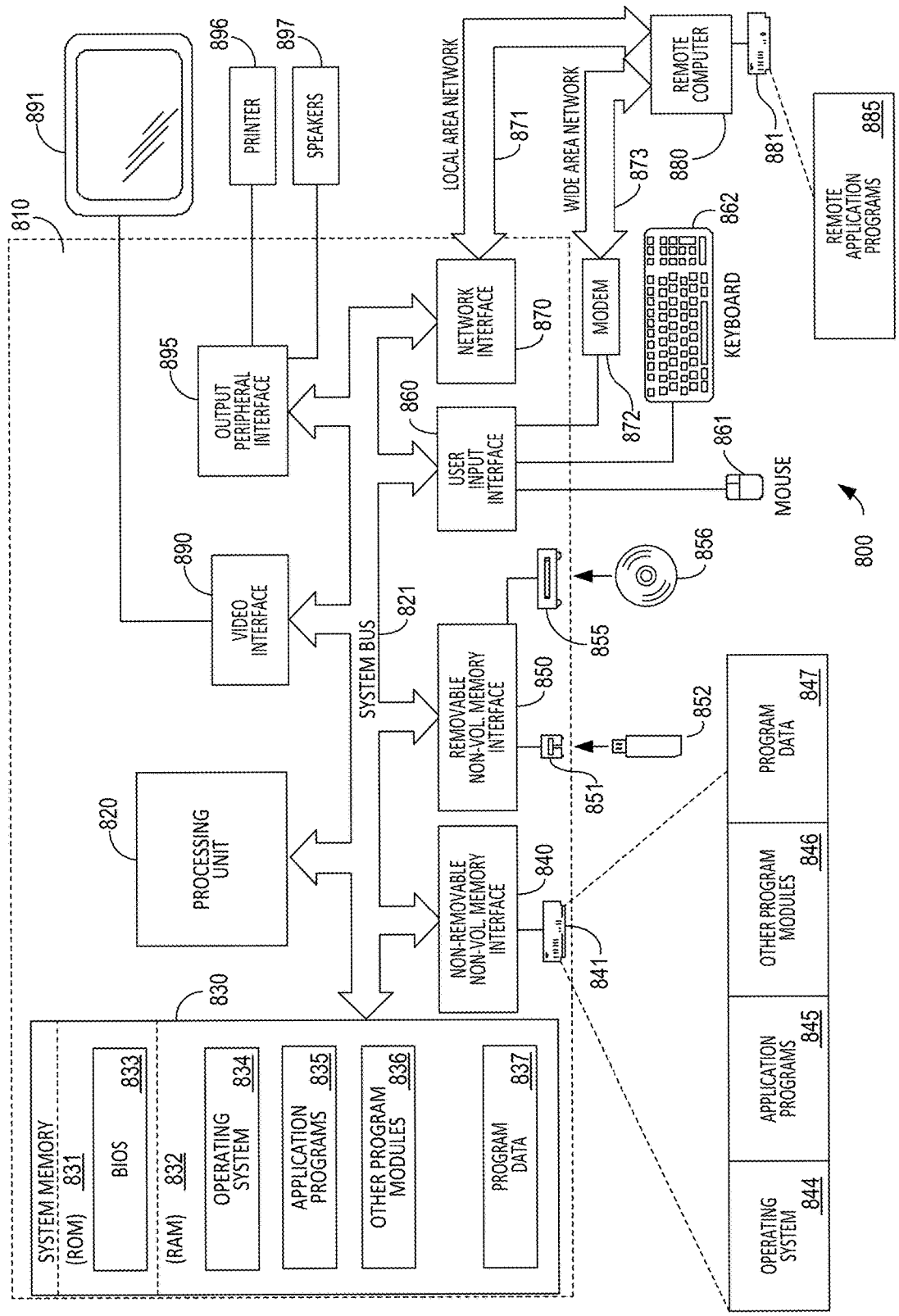
FIG. 8 is a block diagram of a system suitable for practicing aspects of the invention, according to some embodiments.

FIG. 8 illustrates an example of a suitable computing system environment 800 on which the technology described herein may be implemented. For example, computing environment 800 may form some or all of the computer system 710 shown in FIG. 7. The computing system environment 800 is only one example of a suitable computing environment and is not intended to suggest any limitation as to the scope of use or functionality of the technology described herein. Neither should the computing environment 800 be interpreted as having any dependency or requirement relating to any one or combination of components illustrated in the exemplary operating environment 800.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the technology described herein includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a flash drive 851 that reads from or writes to a removable, nonvolatile memory 852 such as flash memory, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The terms "approximately," "substantially" and "about" may be used to mean within ±20% of a target value in some embodiments, within ±10% of a target value in some embodiments, within ±5% of a target value in some embodiments, and yet within ±2% of a target value in some embodiments. The terms "approximately," "substantially" and "about" may include the target value.

What is claimed is:

1. An additive fabrication apparatus configured to form a plurality of layers of material on a build platform by directing actinic radiation onto a liquid photopolymer, the additive fabrication apparatus comprising:
   a container;
   the build platform;
   a supporting liquid arranged within the container;
   a leveling element arranged at least partially within the supporting liquid; and
   at least one controller configured to move the leveling element through the supporting liquid.

2. The additive fabrication apparatus of claim 1, wherein the additive fabrication apparatus further comprises a liquid photopolymer arranged within the container over the supporting liquid.

3. The additive fabrication apparatus of claim 1, wherein the supporting liquid has a dielectric constant of at least zero but no greater than 20.

4. The additive fabrication apparatus of claim 1, wherein the supporting liquid comprises a fluorinated hydrocarbon.

5. The additive fabrication apparatus of claim 1, wherein the leveling element comprises a polymeric material.

6. The additive fabrication apparatus of claim 1, wherein, a top side of the leveling element and a bottom side of the leveling element comprise different materials.

7. The additive fabrication apparatus of claim 6, wherein the top side is flat.

8. The additive fabrication apparatus of claim 1, wherein the leveling element further comprises a flow catch configured to prevent flow liquid on a trailing side of the leveling element.

9. The additive fabrication apparatus of claim 8, wherein a bottom edge of the flow catch is perforated.

10. The additive fabrication apparatus of claim 1, wherein the supporting liquid is selected from the group consisting of corn syrup, salt water, Epson salt water, glycerol, Novac 7000, a Fluorinert™, or heavy water.

11. An additive fabrication apparatus configured to form a plurality of layers of material on a build platform by directing actinic radiation onto a liquid photopolymer, the additive fabrication apparatus comprising:
    a container;
    the build platform;
    a supporting liquid arranged within the container; and
    a film coupled to the container and arranged over and in contact with the supporting liquid such that the supporting liquid is enclosed in the container by the film.

12. The additive fabrication apparatus of claim 11, wherein the additive fabrication apparatus further comprises a liquid photopolymer arranged within the container over the film and the supporting liquid such that an upper side of the film contacts the liquid photopolymer and a lower side of the film contacts the supporting liquid.

13. The additive fabrication apparatus of claim 11, wherein the supporting liquid is denser than the liquid photopolymer.

14. The additive fabrication apparatus of claim 11, wherein the supporting liquid has a dielectric constant of at least zero but no greater than 20.

15. The additive fabrication apparatus of claim 11, wherein the supporting liquid comprises a fluorinated hydrocarbon.

16. The additive fabrication apparatus of claim 11, wherein the film comprises a polymer selected from the list consisting of polytetrafluoroethylene (PTFE), polymethylpentene (PMP), fluorinated ethylene propylene (FEP), ethylene tetrafluoroethylene (ETFE), a perfluoroalkoxy alkane (PFA), or ultra-high-molecular-weight polyethylene (UHMWP).

17. The additive fabrication apparatus of claim 1, wherein the leveling element is entirely within the supporting liquid.

* * * * *